(12) United States Patent
Matsumoto et al.

(10) Patent No.: US 8,892,303 B2
(45) Date of Patent: Nov. 18, 2014

(54) VEHICLE CONTROL DEVICE

(71) Applicant: Denso Corporation, Kariya (JP)

(72) Inventors: Toshiki Matsumoto, Kariya (JP); Mamoru Sawada, Yokkaichi (JP)

(73) Assignee: Denso Corporation, Kariya (JP)

( * ) Notice: Subject to any disclaimer, the term of this patent is extended or adjusted under 35 U.S.C. 154(b) by 70 days.

(21) Appl. No.: 13/629,750

(22) Filed: Sep. 28, 2012

(65) Prior Publication Data

US 2013/0079987 A1 Mar. 28, 2013

(30) Foreign Application Priority Data

Sep. 28, 2011 (JP) ................... 2011-213003

(51) Int. Cl.
*B60G 17/018* (2006.01)
*B60G 23/00* (2006.01)
(Continued)

(52) U.S. Cl.
CPC ............ *B60W 30/20* (2013.01); *F02D 2250/28* (2013.01); *B60W 2520/16* (2013.01);
(Continued)

(58) Field of Classification Search
CPC .............. B60G 17/018; F02D 41/1497; F02D 41/0225; F02D 2200/1004; F02D 2200/101; F02D 2200/50; F02D 2200/602; B60W 30/20; B60W 2520/16
USPC ...................................................... 701/37, 38
See application file for complete search history.

(56) References Cited

U.S. PATENT DOCUMENTS 8,489,279 B2 * 7/2013 Hidaka et al. ................... 701/38
2007/0254772 A1 * 11/2007 Satou et al. ................... 477/107
(Continued)

FOREIGN PATENT DOCUMENTS

JP 08-272837 10/1996
JP 2003-156413 5/2003
(Continued)

OTHER PUBLICATIONS

Office action dated Aug. 20, 2013 in corresponding Japanese Application No. 2011-213003.

*Primary Examiner* — Calvin Cheung
*Assistant Examiner* — Paula L Schneider
(74) *Attorney, Agent, or Firm* — Harness, Dickey & Pierce, PLC

(57) ABSTRACT

In a vehicle control device, a dynamic characteristics description unit includes a model element simulating dynamic characteristics of motion or deformation of a controlled object. By using the model element, this unit simulates hysteresis characteristics caused during a process of motion or deformation of the controlled object based on at least one of an estimated value of the input manipulated variable and an estimated value of a disturbance input inputted in the controlled object, and defines a control target index of a motion state of the controlled object. A correction amount computing unit calculates a correction amount which adjusts the manipulated variable in such a way that the control target index related to the hysteresis characteristics becomes a desired state. A command output unit corrects manipulated variable based on the correction amount to produce a command for the corrected manipulated variable to output it to the controlled object.

8 Claims, 18 Drawing Sheets

(51) Int. Cl.
  *B62C 3/00* (2006.01)
  *B62K 25/00* (2006.01)
  *G06F 7/00* (2006.01)
  *G06F 17/00* (2006.01)
  *G06F 19/00* (2011.01)
  *F02D 41/14* (2006.01)
  *B60W 30/20* (2006.01)
  *F02D 41/02* (2006.01)

(52) U.S. Cl.
  CPC ...... *F02D 2200/101* (2013.01); *F02D 41/1497* (2013.01); *F02D 2200/50* (2013.01); *F02D 2250/18* (2013.01); *F02D 2200/602* (2013.01); *B60W 2030/206* (2013.01); *F02D 2200/501* (2013.01); *F02D 2200/1004* (2013.01); *F02D 41/0225* (2013.01)

USPC ............................................... 701/37; 701/38

(56) References Cited

U.S. PATENT DOCUMENTS

2011/0137514 A1* 6/2011 Itabashi .......................... 701/29
2013/0166165 A1* 6/2013 Murata et al. .................. 701/70

FOREIGN PATENT DOCUMENTS

| JP | 2007-292031 | 11/2007 |
| JP | 2010-092225 | 4/2010 |
| JP | 2011-089474 | 5/2011 |

* cited by examiner

VIBRATORY FORCE ACTING ON DRIVE SHAFT IN FORWARD/
BACKWARD DIRECTION (FLUCTUATION COMPONENT dFds/dt)

INPUT

VIBRATORY FORCE ACTING ON DRIVE SHAFT IN FORWARD/
BACKWARD DIRECTION (FLUCTUATION COMPONENT dFds/dt)

INPUT

FRONT MOUNT DAMPER DISTORTION AMOUNT (Xef)

REAR MOUNT DAMPER DISTORTION AMOUNT (Xef)

ENGINE ROLL ANGULAR VELOCITY (d$\theta$e/dt)

VEHICLE CONTROL DEVICE

CROSS-REFERENCE TO RELATED APPLICATION

This application is based on and claims the benefit of priority from earlier Japanese Patent Application No. 2011-213003 filed Sep. 28, 2011, the description of which is incorporated herein by reference.

BACKGROUND OF THE INVENTION

1. Technical Field of the Invention

The present invention relates to a vehicle control device, and in particular, to a vehicle control device that controls a motional state of a controlled object which moves or deforms, in accordance with a manipulated variable.

2. Related Art

In a vehicle, generally, there are many portions that cause coupled vibration between at least two components coupled with each other via suspension components having an anti-vibration function based on spring-damping characteristics. As is known in related art, an example of coupled vibration is caused between (i) a vehicle body (sprung portion) coupled by suspension components, (ii) a vehicle body coupled by components of an unsprung system or engine mounts, and (iii) an engine transaxle. This coupled vibration affects ride quality of the vehicle but also travelling performance thereof.

In related art, various devices or inventions have been proposed in order to suppress the coupled vibration as explained above. For example, there is proposed a control method that controls (i) force that causes coupled vibration in an intended system, (ii) drive torque which is source of generation of torque reaction force, or (iii) another manipulated force itself, so that the coupled vibration is not produced or is rapidly damped (for example, see JP-A-2011-089474).

In JP-A-2011-089474, there is proposed a method of controlling engine torque based on an estimated value of vibration that is estimated using a model relating to roll vibration of the engine so as to suppress vibration of the engine. Specifically, in this method, the engine torque is controlled on the basis of a running condition of the vehicle, and then, a roll angle and roll angular velocity of the engine are controlled to be an amount appropriate for stabilizing the vehicle. Here, the roll angle and roll angular velocity are calculated on the basis of a steering angle and an estimated value of a lateral G-force (gravity).

However, depending on modeling of a system which is a controlled object, i.e., a mode of a mathematical description method, the known method as explained above has no design freedom and cannot express important characteristics of an actual system which is simulated. As a result, there is an issue that suitable vehicle performance cannot be exploited.

JP-A-2011-089474 discloses a method of mathematical description for spring and damping properties of an engine mount and a suspension. However, this method just uses a parallel model of general spring and damping elements. In an actual vehicle, the portion causing the above-explained coupled vibration has non-linear characteristics such as hysteresis characteristics caused by various factors, e.g., physical properties of suspension components, or three-dimensional shape factors related to a mounting. In contrast, it is difficult for a linear model used in the method disclosed in JP-A-2011-089474, etc. to simulate the non-linear characteristics such as the hysteresis characteristics as explained above. Therefore, in related art, there is an issue that it is especially difficult to accurately identify important dynamic characteristics related to vibration suppression performance.

SUMMARY

It is thus desired to provide a vehicle control device which is able to facilitate design of a control system and to produce vibration suppression effects, with respect to even vibration of a controlled object having non-linear characteristics.

According to an exemplary aspect of the present disclosure, there is provided vehicle control device for controlling a motion state of a controlled object which moves or deforms, in accordance with a manipulated variable inputted from outside, comprising: a dynamic characteristics description unit that (i) includes a model element for simulating dynamic characteristics of motion or deformation of the controlled object, (ii) simulates, using the model element, hysteresis characteristics caused during a process of motion or deformation of the controlled object based on at least one of an estimated value of the manipulated variable and an estimated value of a disturbance input inputted in the controlled object, and (iii) defines a control target index of a motion state of the controlled object related to the hysteresis characteristics; a correction amount computing unit that calculates a correction amount which adjusts the manipulated variable in such a way that the control target index related to the hysteresis characteristics defined by the dynamic characteristics description unit becomes a desired state; and a command output unit that corrects the manipulated variable based on the correction amount calculated by the correction amount computing unit to produce a command for the corrected manipulated variable, and that outputs the command to the controlled object.

According to the exemplary aspect, the vehicle control device simulates hysteresis characteristics caused by the coupled vibration system of the controlled object to define the control target index. Then, this device corrects the manipulated variable by using the correction amount so that the control target index associated with hysteresis characteristics become the desired state. Thus, even for vibrations having non-linear characteristics such as hysteresis characteristics, design of a control system can be facilitated, and vibration suppression effects can be produced.

The model element may include at least one of basic model elements configured by a parallel connection of: a first linear element that connects a first spring element and a first damper element in series; and a second linear element that is any one of a second spring element, a second damper element, or a parallel connection of the second spring element and the second damper element.

According to this configuration, the model element includes at least one of basic model elements configured by the parallel connection of the first element and the second linear element, and then, hysteresis characteristics caused during motion or deformation of the controlled object can be simulated.

The controlled object may include a first element that configures a vehicle, and a second element that is an element configuring the vehicle other than the first element or that is a road surface. The first element and the second element may cause coupled vibration due to coupled vibration spring-damping characteristics of a connection element that connects the first element and the second element or due to spring-damping characteristics of at least one of the first element and the second element.

According to this configuration, the controlled object includes the first and second elements which cause coupled vibration, and then, hysteresis characteristics caused during motion or deformation of the controlled object that includes elements configuring a vehicle can be simulated. For example, coupled vibration of the controlled object having hysteresis characteristics caused by spring-damping characteristics due to a viscoelasticity of the connection element or a viscoelasticity of the first or second element itself can be simulated.

The first element may be a vehicle body of the vehicle. The second element may be an engine of the vehicle. The vehicle body and the engine may be connected by the connection element configuring a vibration suppression device. The manipulated variable may be a required drive shaft torque that is inputted in the engine. The disturbance input may be a disturbance load that is inputted from a road surface.

According to this configuration, the first element is a vehicle body of the vehicle, and the second element is an engine of the vehicle. Thus, coupled vibration of the controlled object caused by a fluctuation of a drive torque of the engine or a fluctuation of a disturbance load received from a road surface via a tire of the vehicle can be controlled. Specifically, dynamic characteristics of coupled vibration of the engine and the vehicle body can be simulated as dynamic characteristics having hysteresis characteristics. Here, the coupled vibration is caused by a viscoelasticity of a vibration suppression device.

The vibration suppression device may be provided with a front mount located at a front side of the vehicle and a rear mount located at a rear side of the vehicle. The control target index is expressed by a formula of a linear combination of at least one of a stroke displacement of the front mount, a stroke velocity of the front mount, a stroke displacement of the rear mount, a stroke velocity of the rear mount, a roll angle displacement of the engine, a roll angular velocity of the engine, an up/down direction displacement of the vehicle body, an up/down direction velocity of the vehicle body, a pitch angle displacement of the vehicle body, and a pitch angular velocity of the vehicle body. The correction amount computing unit may calculate the correction amount in such a way that the control target index becomes a minimum value.

According to this configuration, the control target index is expressed by a formula of a linear combination of at least one of a linear combination of at least one of a stroke displacement of the front mount, a stroke velocity of the front mount, a stroke displacement of the rear mount, a stroke velocity of the rear mount, a roll angle displacement of the engine, a roll angular velocity of the engine, an up/down direction displacement of the vehicle body, an up/down direction velocity of the vehicle body, a pitch angle displacement of the vehicle body, and a pitch angular velocity of the vehicle body. Then, the correction amount is calculated in such a way that the control target index becomes a minimum value. Due to this, coupled vibration of the controlled object can be suppressed. Specifically, the required drive shaft torque is corrected by using the above correction amount to produce a command for the corrected required drive shaft torque. Then, the command is outputted to the engine. Thus, a drive torque produced in the engine is controlled, so that coupled vibration of the controlled object can be suppressed.

DETAILED DESCRIPTION OF THE PREFERRED EMBODIMENTS

Referring to FIGS. 1 to 18, an exemplary embodiment of the present invention is described below.

Figure 1:
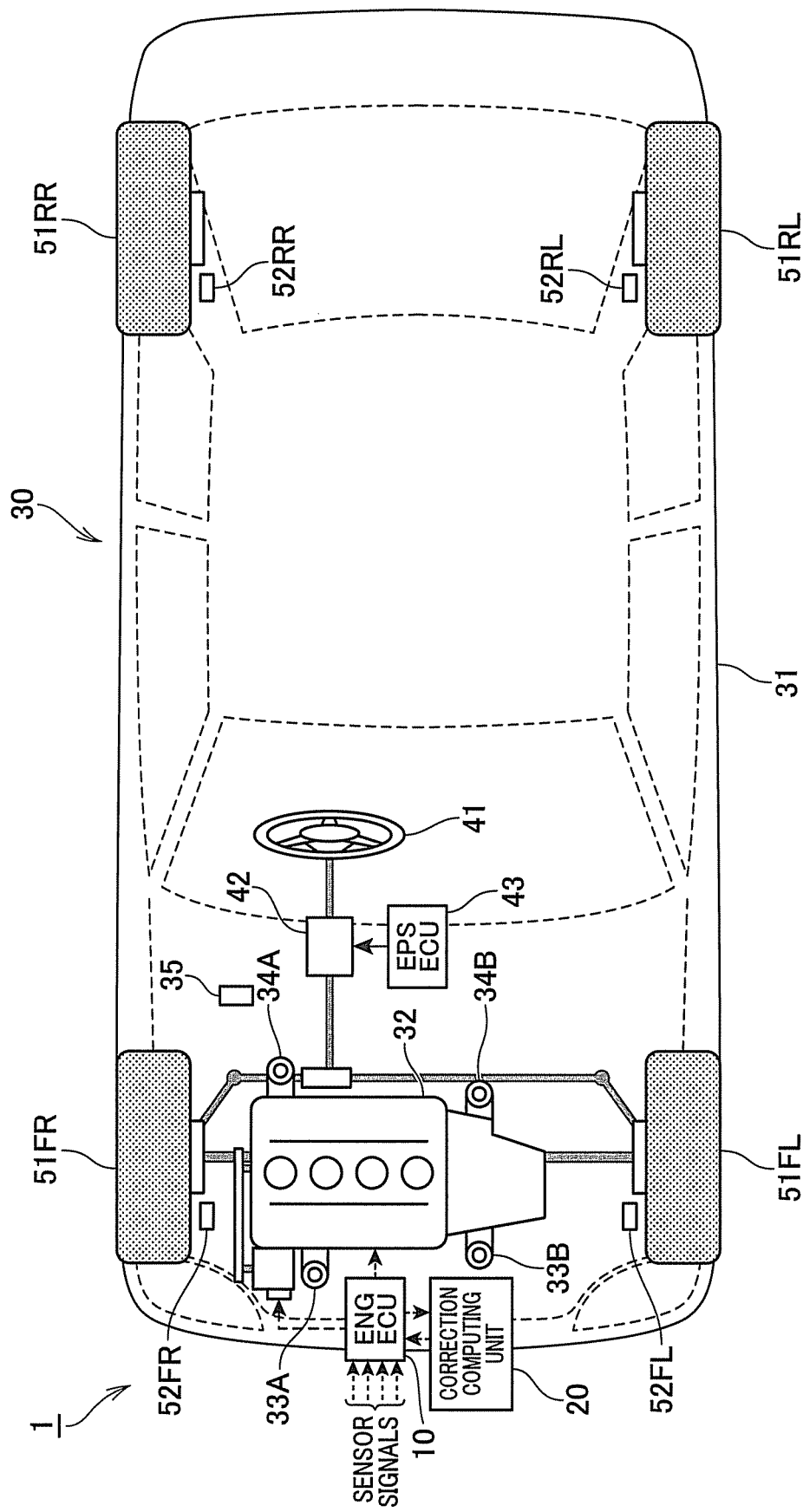
FIG. 1 is a schematic diagram showing a configuration of a vehicle control device according to an embodiment of the present invention.

FIG. 1 is a schematic diagram showing a configuration of a vehicle control device 1 according to the present embodiment. As shown in FIG. 1, the vehicle control device 1 controls torque of a drive shaft of an engine (second element) 32 which is an engine of a front engine front drive type vehicle (hereinafter referred to as "FF vehicle") 30, thereby suppressing coupled vibration with hysteresis characteristics of a vehicle body (first element) 31 of the FF vehicle 30 and the engine 32.

The engine 32 is supported by the vehicle body 31 through front mounts (coupling element) 33A and 33B at two portions of a front side of the FF vehicle 30 and through rear mounts (coupling element) 34A and 34B at two portions of a rear side of the FF vehicle 30. In the present embodiment, the engine 32 is transversely mounted in the FF vehicle 30. In other words, the drive shaft of the engine 32 is arranged in such a way as to be elongated in a left/right direction of the FF vehicle 30.

The vehicle control device 1 is mainly provided with an engine electronic control unit (ECU) 10 and a correction computing unit 20. The engine ECU 10 receives sensor outputs from various sensors located at predetermined portions of the FF vehicle 30 and controls the engine 32 based on the received sensor outputs. The correction computing unit 20 corrects a required drive shaft torque for controlling a drive shaft torque produced by the engine 32, among control signals transmitted from the engine ECU 10 to the engine 32.

The engine ECU 10 is configured by a microcomputer including a central processing unit (CPU), a read only memory (ROM), a random access memory (RAM), an input-output interface, etc. The ECU 10 executes control programs stored in a storage device such as the ROM, thereby performing computing processes such as a process to produce control signals for controlling the engine 32.

The input-output interface of the engine ECU 10 receives, for example, (i) an accelerator opening degree signal which corresponds to an output of an opening degree sensor 35, (ii) a steering angle signal which is a detected signal of a steering angle of an steering 41, and (iii) four-wheel speed signals which correspond to outputs of wheel side sensors 52 FR, 52FL, 52RR, and 52 RL that are located near four wheels, i.e., front wheels 51 FR, 51FL and rear wheels 51RR, 51 RL.

Here, in a pathway in which the steering angle of the steering 41 is transmitted to the front wheels 51 FR and 51FL, there is provided (i) an electric power steering motor (hereinafter referred to as "EPS motor") 42 that assists an steering torque, and (ii) an electric power steering ECU (hereinafter referred to as "EPS ECU") 43 that controls the EPS motor 42. The EPS ECU 43 detects steering of the steering 41 and executes control to produce, in the EPS motor 42, a part of torque required to steer the front wheels 51 FR and 51FL, thereby being able to easily steer the FF vehicle 30.

The correction computing unit 20 of the present embodiment is configured by the CPU of the engine ECU 10 executing computing programs stored in a storage unit such as the ROM of the engine ECU 10. A detailed process of the correction computing unit 20 is described below. The correction computing unit 20 may be configured by another ECU independent of the engine ECU 10, for example, a dedicated ECU for a correction process of the present invention, or the EPS ECU 43 as explained above. In this case, a corrected required drive shaft torque is inputted in the engine ECU 10 though communication means such as a controller area network (CAN).

Figure 2:
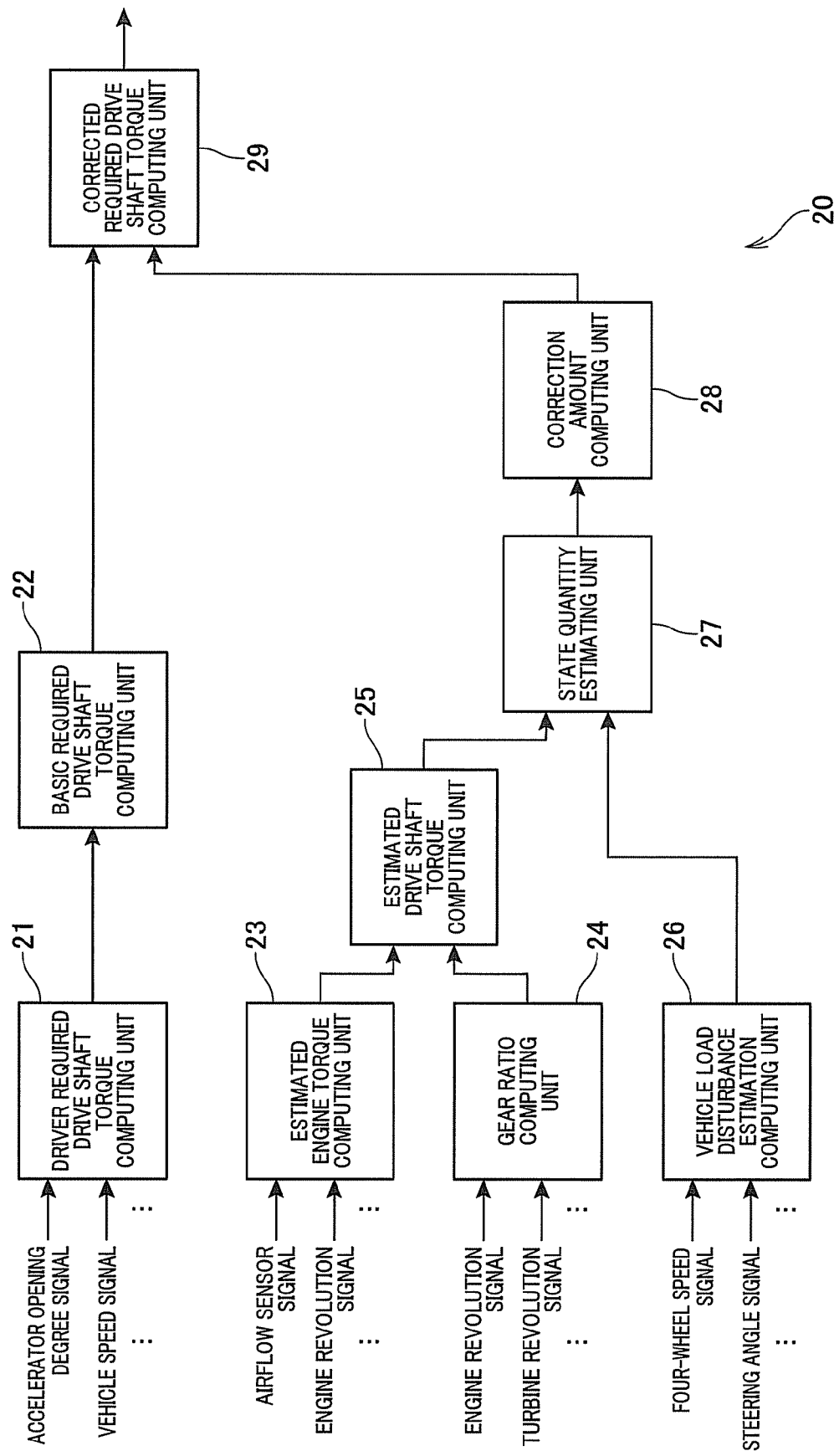
FIG. 2 is a block diagram explaining a detailed configuration of a correction computing unit of FIG. 1.

FIG. 2 is a block diagram showing a detailed configuration of the correction computing unit 20. As shown in FIG. 2, the correction computing unit 20 includes a driver required drive shaft torque computing unit 21, a basic required drive shaft torque computing unit 22, an estimated engine torque computing unit 23, a gear ratio computing unit 24, an estimated drive shaft torque computing unit 25, a vehicle load disturbance estimation computing unit 26, a state quantity estimating unit (dynamic characteristics description unit) 27, a correction amount computing unit (correction amount computing unit) 28, and a corrected required drive shaft torque computing unit (manipulated variable command output unit) 29.

The driver required drive shaft torque computing unit 21 receives signals associated with acceleration and deceleration of the FF vehicle 30 such as an accelerator opening degree signal or a vehicle speed signal, and, based on the these signals, calculates a driver required drive shaft torque relating to a driver's request.

Based on the calculated driver required drive shaft torque, the basic required drive shaft torque computing unit 22 calculates a basic required drive shaft torque (manipulated variable) which is a torque required for the engine 31. Here, the basic required drive shaft torque is an uncorrected basic required drive shaft torque before a correction process of the present invention is performed.

The estimated engine torque computing unit 23 receives signals such as an airflow sensor signal indicating a flow rate of an intake flow in the engine 32 or an engine revolution signal indicating a revolution of the engine 32, and, based on these signals, calculates an engine torque (estimated engine torque) which is a torque estimated to be produced in the engine 32.

The gear ratio computing unit 24 receives signals such as an engine revolution signal and a turbine revolution signal, and, based on these signals, calculates a gear ratio of the engine transaxle.

Based on the calculated estimated engine torque and the calculated gear ration of the engine transaxle, the estimated drive shaft torque computing unit 25 calculates a drive shaft torque (estimated value) which is estimated to be transmitted to the drive shaft that driving the front wheels 51FR and 51 FL from the engine transaxle.

The vehicle load disturbance estimation computing unit 26 receives signals such as a four-wheel speed signal indicating a revolution speed of the front wheels 51FR, 51FL and the rear wheels 51RR, 51RL, or a steering angle signal indication a steering angle of the steering wheel 41. Based on these signals, the vehicle load disturbance estimation computing unit 26 executes a computing process to estimate a vehicle load disturbance (estimated value of a disturbance input) such as (i) an external force transmitted to the vehicle body 31 through the front wheels 51FR, 51FL, the rear wheels 51RR, RL due to a concavo-convex road surface, or (ii) an external force acting on the vehicle body 31 and the engine 32 due to a steer of the steering wheel 41.

The state quantity estimating unit 27 receives the drive shaft torque estimated by the estimated drive shaft torque computing unit 25 and the vehicle load disturbance estimated by the vehicle load disturbance estimation computing unit 26. The state quantity estimating unit 27 uses an engine/body coupled vibration model (model element) as described below to simulate motion characteristics of the vehicle body 31 having hysteresis characteristics and to define parameters which are a control target index for a motion state of the engine 32, etc. and the vehicle body 31.

The correction amount computing unit 28 calculates a drive shaft torque correction amount for adjusting the basic required drive shaft torque in such a way that parameters associated with hysteresis characteristics among the defined parameters becomes a desired state which is described in detail below.

Based on the drive shaft torque correction amount, the corrected required drive shaft torque computing unit 29 corrects the basic required drive shaft torque to calculate a corrected requirement drive shaft torque. The corrected required drive shaft torque is inputted in the ECU 10 controlling the engine 32. Based on this, the ECU 10 controls the engine 32.

Figure 3:
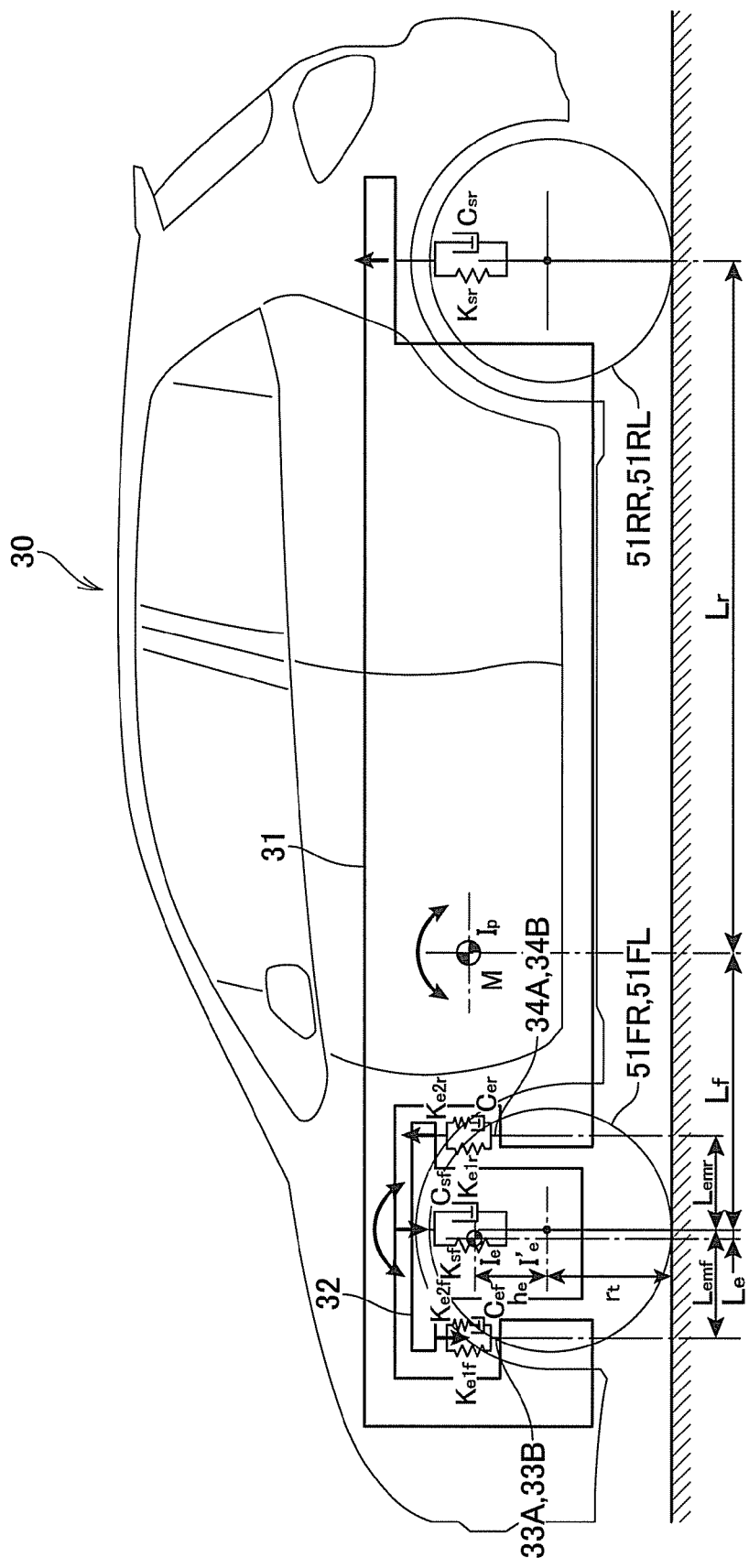
FIG. 3 is a schematic diagram explaining specifications of an engine/body coupled vibration model.

Next, a derivation of the engine/body coupled vibration model in the state quantity estimating unit 27 is described below. FIG. 3 is a schematic diagram explaining specifications of the engine/body coupled vibration model. First, the specifications used for deriving the engine/body coupled vibration model are described with reference to FIG. 3.

In the specifications shown in FIG. 3:

$h_e$ is a height of a center of gravity of the engine 32, etc. based on a height of a wheel center (m);

$L_e$ is a horizontal distance from a center of gravity of the engine 32, etc. to an axis position of the front wheels 51FR and 51FL (m);

$L_{emf}$ is a horizontal distance from a position of the front mounts 33A and 33B to an axis position of the front wheels 51FR and 51FL (m);

$L_{emr}$ is a horizontal distance from a position of the rear mounts 34A and 34B to an axis position of the front wheels 51FR and 51FL (m);

$L_f$ is a distance from a center of gravity of the vehicle body 31 to an axis position of the front wheels 51FR and 51FL (m);

$L_r$ is a distance from the center of gravity of the vehicle body 31 to an axis position of the rear wheels 51RR and 51RL (m);

r is a tire radius (m);

$I_e$ is a moment of inertia for rotation around the center of gravity of the engine 32, etc. (kgm$^2$);

$I'_e$ is a moment of inertia for rotation around a front wheel drive shaft of the engine 32, etc. (kgm$^2$);

M is a sprung mass of the vehicle body 31 (kgm$^2$);

$I_p$ is a moment of inertia for pitching of the vehicle body 31 (kgm$^2$);

$K_{e1f}$ is a spring constant for the second linear element of the front mounts 33A and 33B (N/m);

$K_{e2f}$ is a spring constant for the first linear element of the front mounts 33A and 33B (N/m);

$C_{ef}$ is a damper attenuation coefficient for the first linear element of the front mounts 33A and 33B (N$_s$/m);

$K_{e1r}$ is a spring constant for the second linear element of the rear mounts 34A and 34B (N/m);

$K_{e2r}$ is a spring constant for the first linear element of the rear mounts 34A and 34B (N/m);

$C_{er}$ is a damper attenuation coefficient for the first linear element of the rear mounts 34A and 34B (N$_s$/m);

$K_{sf}$ is a spring constant of suspension for the front wheels 51FR and 51FL (N/m);

$C_{sf}$ is a damper attenuation coefficient of suspension for the front wheels 51FR and 51FL (N$_s$/m);

$K_{sr}$ is a spring constant of suspension for the rear wheels 51RR and 51RL (N/m); and $C_{sr}$ is a damper attenuation coefficient of suspension for the rear wheels 51RR and 51RL (N$_s$/m);

Here, a combination of $K_{e1f}$ and $K_{e2f}$ in the front mount 33A may be equal to or different from a combination of $K_{e1f}$ and $K_{e2f}$ in the front mounts 33B. In the same way, a combination of $K_{e1f}$ and $K_{e2f}$ in the rear mount 34A may be equal to or different from a combination of $K_{e1f}$ and $K_{e2f}$ in the rear mounts 34B.

The engine/body coupled vibration model is a model in which a controlled object is a coupled vibration system of the engine 32, etc. and the vehicle body 31 in the case where the engine 32 is transversely mounted in the vehicle body 31 of the FF vehicle 30 as explained above.

Specifically, due to a reaction force of a drive torque acting around a rotational center of the drive shaft, the engine 32, etc. causes a rolling vibration in a forward/backward direction of the vehicle body 31. At this time, a force suppressing this roll vibration acts due to spring-damper characteristics of the front mounts 33A, 33B and the rear mounts 34A, 34B which are coupled with the engine 32 and the vehicle body 31.

On the other hand, the vehicle body 31 receives a reaction force from the front mounts 33A, 33B and the rear mounts 34A, 34B to cause a pitching vibration. At this time, a force suppressing this pitching vibration acts due to spring-damper characteristics of a suspension of the front wheels 51FR, 51FL and the rear wheels 51RR, 51RL.

With respect to a coupled vibration system of the rolling vibration of the engine 32, etc. and the pitching vibration of the vehicle body 31 as explained above, basic equations expressed by the following formulae (1) to (5) are obtained from a dynamic balance relationship between a force and moment acting on each portion.

$$K_{e2f}(L_{emf}\theta_e - x_{ef}) = C_{ef}\left[\dot{x}_{ef} - \{\dot{x}_v + (L_f + L_{emf})\dot{\theta}_p\}\right] \quad (1)$$

$$-K_{e2r}(L_{emr}\theta_e + x_{er}) = C_{er}\left[\dot{x}_{er} - \{\dot{x}_v + (L_f - L_{emr})\dot{\theta}_p\}\right] \quad (2)$$

$$I'_e\ddot{\theta}_e = -L_{emf}K_{e1f}[L_{emf}\theta_e - \{x_v + (L_f + L_{emf})\theta_p\}] - \quad (3)$$
$$L_{emf}K_{e2f}(L_{emf}\theta_e - x_{ef}) - L_{emr}K_{e1r}[L_{emr}\theta_e + \{x_v + (L_f - L_{emr})\theta_p\}] -$$
$$L_{emr}K_{e2r}(L_{emr}\theta_e + x_{er}) + \Delta T_w$$

-continued $$M\ddot{x}_v = -K_{sf}(x_v + L_f\theta_p) - C_{sf}(\dot{x}_v + L_f\dot{\theta}_p) - K_{sr}(x_v - L_r\theta_p) - \\ C_{sr}(\dot{x}_v + L_r\dot{\theta}_p) - K_{e1f}\{x_v + (L_f + L_{emf})\theta_p - L_{emf}\theta_e\} - \\ C_{ef}\{\dot{x}_v + (L_f + L_{emf})\dot{\theta}_p - \dot{x}_{ef}\} - \\ K_{e1r}\{x_v + (L_f - L_{emr})\theta_p + L_{emr}\theta_e\} - C_{ef}\{\dot{x}_v + (L_f - L_{emr})\dot{\theta}_p - \dot{x}_{er}\} \quad (4)$$

$$I_p\ddot{\theta}_p = -L_f\{K_{sf}(x_v + L_f\theta_p) + C_{sf}(\dot{x}_v + L_f\dot{\theta}_p)\} + \\ L_r\{K_{sr}(x_v - L_r\theta_p) + C_{sr}(\dot{x}_v - L_r\dot{\theta}_p)\} - \\ (L_f + L_{emf})[K_{e1f}\{x_v + (L_f + L_{emf})\theta_p - L_{emf}\theta_e\} + \\ C_e\{\dot{x}_v + (L_f + L_{emf})\dot{\theta}_p - \dot{x}_{ef}\}] - (L_f - L_{emr})[\\ K_{e1r}\{x_v + (L_f - L_{emr})\theta_p + L_{emr}\theta_e\} + C_e\{\dot{x}_v + (L_f - L_{emr})\dot{\theta}_p - \dot{x}_{ef}\}] \quad (5)$$

In the formulae (1) to (5):

$x_{ef}$ is an up/down direction displacement of a series spring-damper connection point of the front mounts 33A and 33B;

$x_{er}$ is an up/down direction displacement of a series spring-damper connection point of the rear mounts 34A and 34B;

$x_v$ is an up/down direction displacement of a center of gravity of the vehicle body 31:

$\theta_e$ is a roll angle displacement of the engine 32, etc.:

$\theta_p$ is a pitch angle displacement of the vehicle body 31: and $\Delta T_w$ is a fluctuation component of the drive shaft torque from a steady state.

The above formulae (1) to (5) are reorganized so that simultaneous differential equations expressed by the following formulas (1') to (5') can be obtained.

$$\ddot{x}_{ef} = -\frac{K_{e2f}}{C_{ef}}x_{ef} + L_{emf}\frac{K_{e2f}}{C_{ef}}\theta_e + \dot{x}_v + (L_f + L_{emf})\dot{\theta}_p \quad (1')$$

$$\ddot{x}_{er} = -\frac{K_{e2r}}{C_{er}}x_{er} - L_{emr}\frac{K_{e2r}}{C_{er}}\theta_e + \dot{x}_v + (L_f - L_{emr})\dot{\theta}_p \quad (2')$$

$$\ddot{\theta}_e = \frac{L_{emf}K_{e2f}}{I'_e}x_{ef} - \frac{L_{emr}K_{e2r}}{I'_e}x_{er} - \\ \frac{1}{I'_e}\{L^2_{emf}(K_{e1f} + K_{e2f}) + L^2_{emr}(K_{e1r} + K_{e2r})\}\theta_e + \\ \frac{1}{I'_e}(L_{emf}K_{e1f} - L_{emr}K_{e1r})x_v + \\ \frac{1}{I'_e}\{L_{emf}K_{e1f}(L_f + L_{emf}) - L_{emr}K_{e1r}(L_f - L_{emr})\}\theta_p + \frac{1}{I'_e}\Delta T_w \quad (3')$$

$$\ddot{x}_v = -\frac{K_{e2f}}{M}x_{ef} - \frac{K_{e2r}}{M}x_{er} + \\ \frac{1}{M}\{L_{emf}(K_{e1f} + K_{e2f}) - L_{emr}(K_{e1r} + K_{e2r})\}\theta_e - \\ \frac{1}{M}(K_{e1f} + K_{e1r} + K_{sf} + K_{sr})x_v - \frac{1}{M}(C_{sf} + C_{sr})\dot{x}_v - \\ \frac{1}{M}\{(L_f + L_{emf})K_{e1f} + (L_f - L_{emr})K_{e1r} + L_fK_{sf} - L_rK_{sr}\}\theta_p - \\ \frac{1}{M}(L_fC_{sf} - L_rC_{sr})\dot{\theta}_p \quad (4')$$

$$\ddot{\theta}_p = -\frac{(L_f + L_{emf})}{I_p}K_{e2f}x_{ef} - \\ \frac{(L_f - L_{emr})}{I_p}K_{e2r}x_{er} + \frac{1}{I_p}\{(L_f + L_{emf})L_{emf}(K_{e1f} + K_{e2f}) - \\ (L_f - L_{emr})L_{emr}(K_{e1r} + K_{e2r})\}\theta_e - \\ \frac{1}{I_p}\{(L_f + L_{emf})K_{e1f} + (L_f - L_{emr})K_{e1r} + L_fK_{sf} - L_rK_{sr}\}x_v - \\ \frac{1}{I_p}(L_fC_{sf} - L_rC_{sr})\dot{x}_v - \\ \frac{1}{I_p}\{(L_f + L_{emf})^2K_{e1f} + (L_f - L_{emr})^2K_{e1r} + L_f^2K_{sf} + L_r^2K_{sr}\}\theta_p - \\ \frac{1}{I_p}(L_f^2C_{sf} + L_r^2C_{sr})\dot{\theta}_p \quad (5')$$

Further, independent variables in the above formulae (1') to (5') are defined as state quantities to be expressed in the format of the following state equation (6), thereby being able to be formulated as a linear state space model.

$$\begin{bmatrix} \dot{x}_1 \\ \dot{x}_2 \\ \dot{x}_3 \\ \dot{x}_4 \\ \dot{x}_5 \\ \dot{x}_6 \\ \dot{x}_7 \\ \dot{x}_8 \end{bmatrix} = \begin{bmatrix} a_1 & 0 & a_3 & 0 & 0 & a_6 & 0 & a_8 \\ 0 & b_2 & b_3 & 0 & 0 & b_6 & 0 & b_8 \\ 0 & 0 & 0 & 1 & 0 & 0 & 0 & 0 \\ c_1 & c_2 & c_3 & 0 & c_5 & 0 & c_7 & 0 \\ 0 & 0 & 0 & 0 & 0 & 1 & 0 & 0 \\ d_1 & d_2 & d_3 & 0 & d_5 & d_6 & d_7 & d_8 \\ 0 & 0 & 0 & 0 & 0 & 0 & 0 & 1 \\ e_1 & e_2 & e_3 & 0 & e_5 & e_6 & e_7 & e_8 \end{bmatrix} \begin{bmatrix} x_1 \\ x_2 \\ x_3 \\ x_4 \\ x_5 \\ x_6 \\ x_7 \\ x_8 \end{bmatrix} + \begin{bmatrix} 0 \\ 0 \\ 0 \\ p \\ 0 \\ 0 \\ 0 \\ 0 \end{bmatrix} u \quad (6)$$

Figure 4:
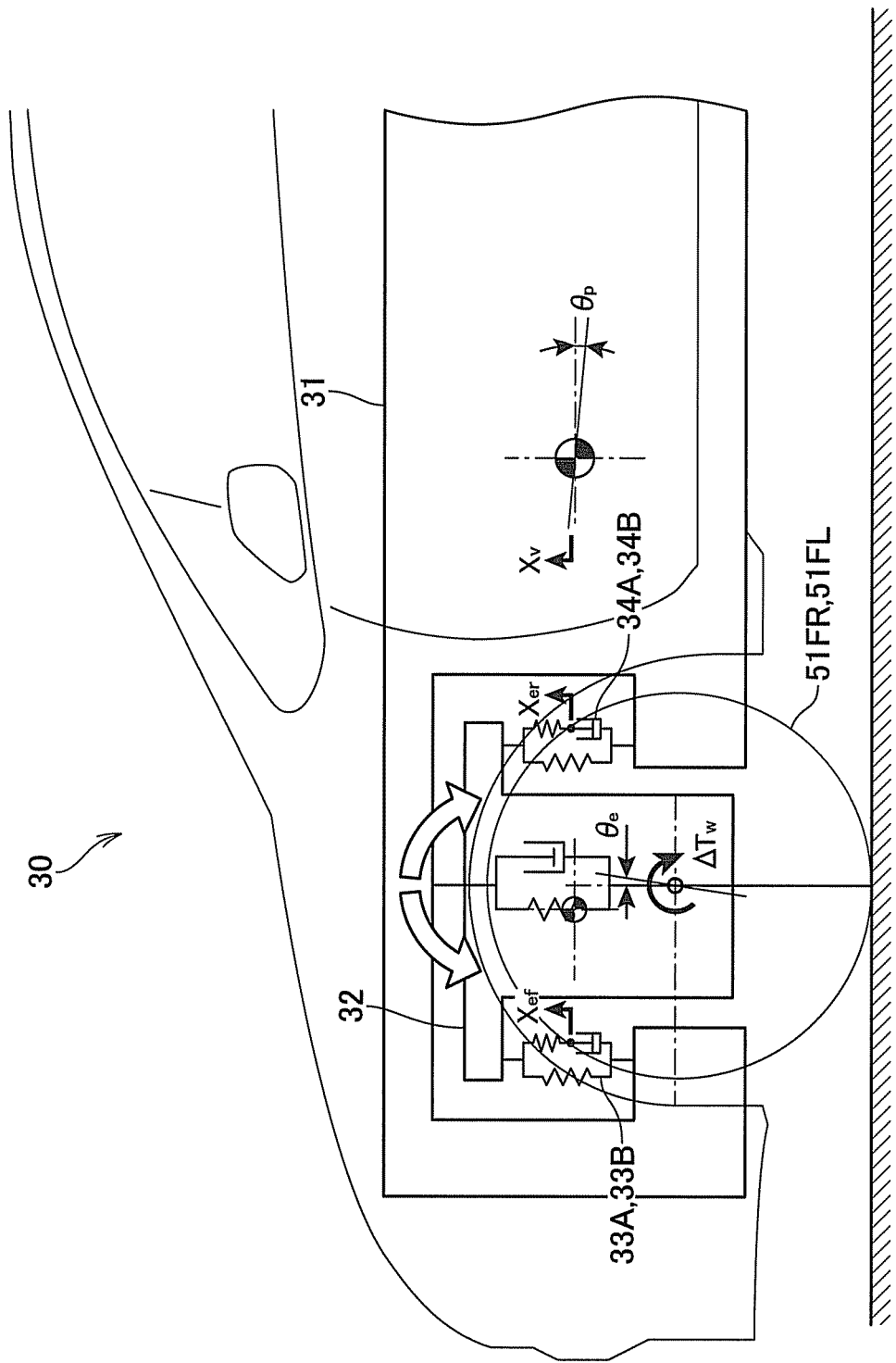
FIG. 4 is a schematic diagram showing positions of state variables and inputs in state equations.

In the above state equation (6), state variables ($x_1$ to $x_8$) and an input $\mu$ are defined as follows. FIG. 4 shows positions of e.g., displacements expressed by the state variables $x_1$ to $x_8$ in the FF vehicle 30 and a position of the input $\mu$.

state viable
- $x_1 = x_{ef}$: up/down direction displacement of series spring/damper connection point of spring and damper at front mount (m)
- $x_2 = x_{er}$: up/down direction displacement of series spring/damper connection point of spring and damper at rear mount (m)
- $x_3 = \theta_e$: roll angle displacement of engine, etc (rad)
- $x_4 = \dot{\theta}_e$: roll angular velocity of engine, etc (rad/s)
- $x_5 = x_v$: up/down direction displacement of center of gravity of vehicle body (m)
- $x_6 = \dot{x}_v$: up/down direction velocity of center of gravity of vehicle body (m/s)
- $x_7 = \theta_p$: pitch angle displacement of vehicle body (rad)
- $x_8 = \dot{\theta}_p$: pitch angular velocity of vehicle body (rad/s)

input $\mu = \Delta T_w$: fluctuation component of drive torque from steady state A respective constant of a coefficient matrix in the state equation (6) is defined by using values of specifications of the FF vehicle 30 as follows.

$$a_1 = -\frac{K_{e2f}}{C_{ef}}, \quad a_3 = L_{emf}\frac{K_{e2f}}{C_{ef}}, \quad a_6 = 1, \quad a_8 = L_f + L_{emf}$$

$$b_2 = -\frac{K_{e2r}}{C_{er}}, \quad b_3 = -L_{emr}\frac{K_{e2r}}{C_{er}}, \quad b_6 = 1, \quad b_8 = L_f - L_{emr}$$

$$c_1 = \frac{L_{emf}K_{e2f}}{I'_e}, \quad c_2 = \frac{L_{emr}K_{e2r}}{I'_e}, \quad c_3 = -\frac{1}{I'_e}\{L_{emf}^2(K_{e1f}+K_{e2f}) + L_{emr}^2(K_{e1r}+K_{e2r})\},$$

$$c_5 = \frac{1}{I'_e}(L_{emf}K_{e1f} - L_{emr}K_{e1r}), \quad c_7 = \frac{1}{I'_e}\{L_{emf}K_{e1f}(L_f+L_{emr}) - L_{emr}K_{e1r}(L_f-L_{emr})\}$$

$$d_1 = -\frac{K_{e2f}}{M}, \quad d_2 = -\frac{K_{e2r}}{M}, \quad d_3 = \frac{1}{M}\{L_{emf}(K_{e1f}+K_{e2f}) - L_{emr}(K_{e1r}+K_{e2r})\},$$

$$d_5 = -\frac{1}{M}(K_{e1f}+K_{e1r}+K_{sf}+K_{sr}), \quad d_6 = -\frac{1}{M}(C_{sf}+C_{sr}),$$

$$d_7 = -\frac{1}{M}\{(L_f+L_{emr})K_{e1f} + (L_f-L_{emr})K_{e1r} + L_f K_{sf} - L_r K_{sr}\}, \quad d_8 = -\frac{1}{M}(L_f C_{sf} + L_r C_{sr})$$

$$e_1 = -\frac{(L_f+L_{emf})}{I_p}K_{e2f}, \quad e_2 = -\frac{(L_f-L_{emr})}{I_p}K_{e2r},$$

$$e_3 = \frac{1}{I_p}\{(L_f+L_{emf})L_{emf}(K_{e1f}+K_{e2f}) - (L_f-L_{emr})L_{emr}(K_{e1r}+K_{e2r})\},$$

$$e_5 = -\frac{1}{I_p}\{(L_f+L_{emf})K_{e1f} + (L_f-L_{emr})K_{e1r} + L_f K_{sf} - L_r K_{sr}\}, \quad e_6 = -\frac{1}{I_p}(L_f C_{sf} - L_r C_{sr}),$$

$$e_7 = -\frac{1}{I_p}\{(L_f+L_{emf})^2 K_{e1f} + (L_f-L_{emr})^2 K_{e1r} + L_f^2 K_{sf} + L_r^2 K_{sr}\},$$

$$e_8 = -\frac{1}{I_p}(L_f^2 C_{sf} + L_r^2 C_{sr})$$

$$p = \frac{1}{I'_e}, \quad I'_e = I_e + m_e(L_e^2 + h_e^2)$$

Figure 5:
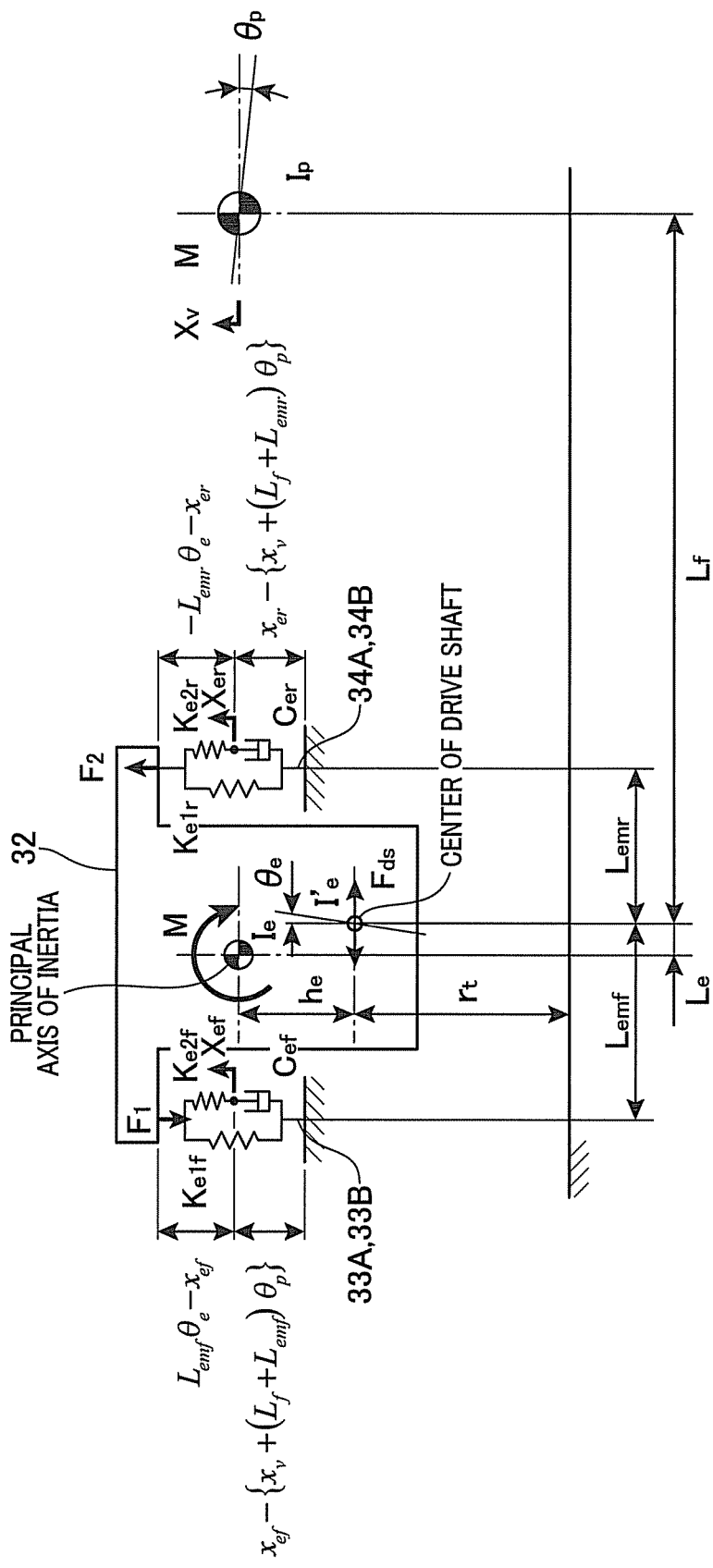
FIG. 5 is a diagram explaining how a rate of change of a translational force acting on a forward/backward direction of a rotational center of a drive shaft is derived.

Next, a derivation of an output equation in the state quantity estimating unit 27 is described below. FIG. 5 is a diagram explaining specifications used in deriving a rate of change ($dF_{ds}/dt$) of a translational force $F_{ds}$ acting on a forward/backward direction of a rotational center of a drive shaft.

When the engine 32, etc. causes a rolling vibration around a center of the drive shaft, the engine 32, etc. is likely to rotate around a principal axis of inertia. Due to this, a couple of forces, which are caused by a moment around a principal axis of inertia, act on a center of a mechanically-restrained drive shaft. Thus, a position of a principal axis of inertia in a roll rotation direction of the engine 32, etc. is deemed to be approximately coincident with a position of a center of gravity of the engine 32, etc. From this, a translational force $F_{ds}$ in a forward/backward direction acting on a center of the drive shaft shown in FIG. 5 can be obtained as follows.

$$F_{ds} = \frac{1}{h_e}(L_{emf} - L_e)K_{e2f}x_{ef} - \frac{1}{h_e}(L_{emr} + L_e)K_{e2r}x_{er} -$$

$$\frac{1}{h_e}\{(L_{emr} - L_e)L_{emf}(K_{e1f} + K_{e2f}) + (L_{emr} + L_e)L_{emr}(K_{e1r} + K_{e2r})\}\theta_e +$$

$$\frac{1}{h_e}\{(L_{emf} - L_e)K_{e1f} - (L_{emr} + L_e)K_{e1r}\}x_v +$$

-continued $$\frac{1}{h_e}\{(L_{emf} - L_e)(L_f + L_{emf})K_{e1f} - (L_{emr} + L_e)(L_f - L_{emr})K_{e1r}\}\theta_p$$

The following formula is derived from a fluctuation component (derivative term) of the above translational force $F_{ds}$.

$$\frac{d}{dt}F_{ds} = \frac{1}{h_e}(L_{emf} - L_e)\frac{K_{e2f}^2}{C_{ef}}x_{ef} + \frac{1}{h_e}(L_{emf} + L_e)\frac{K_{e2r}^2}{C_{er}}x_{er} +$$

$$\frac{1}{h_e}\left\{(L_{emf} - L_e)L_{emf}\frac{K_{e2f}^2}{C_{ef}} + (L_{emf} + L_e)L_{emr}\frac{K_{e2r}^2}{C_{er}}\right\}\theta_e -$$

$$\frac{1}{h_e}\{(L_{emf} - L_e)L_{emf}(K_{e1f} + K_{e2f}) + (L_{emf} + L_e)L_{emf}(K_{e1r} + K_{e2r})\}\theta_e + \frac{1}{h_e}\{(L_{emf} - L_e)(K_{e1f} + K_{e2f}) - (L_{emf} + L_e)(K_{e1r} + K_{e2r})\}\dot{x}_v + \frac{1}{h_e}\{(L_{emf} - L_e)(L_f + L_{emf})(K_{e1f} + K_{e2f}) -$$

$$(L_{emf} + L_e)(L_f - L_{emr})(K_{e1r} + K_{e2r})\}\dot{\theta}_p$$

$$= k_1 x_1 + k_2 x_2 + k_3 x_3 + k_4 x_4 + k_6 x_6 + k_8 x_8$$

In the above formula, coefficients $k_1$ to $k_8$ are defined as follow.

$$\begin{cases} k_1 = \frac{1}{h_e}(L_{emf} - L_e)\frac{K_{e2f}^2}{C_{ef}} \\ k_2 = \frac{1}{h_e}(L_{emf} + L_e)\frac{K_{e2r}^2}{C_{er}} \\ k_3 = \frac{1}{h_e}\left\{(L_{emf} - L_e)L_{emf}\frac{K_{e2f}^2}{C_{ef}} + (L_{emr} + L_e)L_{emr}\frac{K_{e2r}^2}{C_{er}}\right\} \\ k_4 = -\frac{1}{h_e}\{(L_{emf} - L_e)L_{emf}(K_{e1f} + K_{e2f}) + (L_{emr} + L_e)L_{emr}(K_{e1r} + K_{e2r})\} \\ k_6 = \frac{1}{h_e}\{(L_{emf} - L_e)(K_{e1f} + K_{e2f}) - (L_{emf} + L_e)(K_{e1r} + K_{e2r})\} \\ k_8 = \frac{1}{h_e}\{(L_{emf} - L_e)(L_f + L_{emf})(K_{e1f} + K_{e2f}) - \\ \quad (L_{emr} + L_e)(L_f - L_{emr})(K_{e1r} + K_{e2r})\} \end{cases}$$

In conclusion, an output equation of a rate of change ($dF_{ds}/dt$) in a translational force $F_{ds}$ acting on a forward/backward direction of a rotational center of a drive shaft is expressed as follows.

$$y_1 = \frac{dF_{ds}}{dt} = k_1 x_1 + k_2 x_2 + k_3 x_3 + k_4 x_4 + k_6 x_6 + k_8 x_8 \quad (7)$$

$$= [k_1 \; k_2 \; k_3 \; k_4 \; 0 \; k_6 \; 0 \; k_8] \begin{bmatrix} x_1 \\ x_2 \\ x_3 \\ x_4 \\ x_5 \\ x_6 \\ x_7 \\ x_8 \end{bmatrix} = C_1 x$$

$$C_1 = [k_1 \; k_2 \; k_3 \; k_4 \; 0 \; k_6 \; 0 \; k_8]$$

In the above output equation (7), y1 is the rate of change ($dF_{ds}/dt$) in a translational force $F_{ds}$, which configures the parameters related to the hysteresis characteristics. In the present embodiment, y1 is calculated by the state quantity estimating unit 27 and is outputted to the correction amount computing unit 28.

In addition, an output equation of an up/down direction displacement $x_{ef}$ of a series spring-damper connection point of the front mounts 33A, 33B and an output equation of an up/down direction displacement $x_{er}$ of a series spring-damper connection point of the rear mounts 34A, 34B are expressed as follows.

$$y_2 = x_{ef} = x_1 = [1 \; 0 \; 0 \; 0 \; 0 \; 0 \; 0 \; 0] \begin{bmatrix} x_1 \\ x_2 \\ x_3 \\ x_4 \\ x_5 \\ x_6 \\ x_7 \\ x_8 \end{bmatrix} = C_2 x \quad (8)$$

$$C_2 = [1 \; 0 \; 0 \; 0 \; 0 \; 0 \; 0 \; 0]$$

In the above output equation (8), y2 is the up/down direction displacement $x_{ef}$ of a series spring-damper connection point of the front mounts 33A, 33B, which configures the parameters related to the hysteresis characteristics. In the present embodiment, y2 is calculated by the state quantity estimating unit 27 and is outputted to the correction amount computing unit 28.

$$y_3 = x_{er} = x_2 = [0 \; 1 \; 0 \; 0 \; 0 \; 0 \; 0 \; 0] \begin{bmatrix} x_1 \\ x_2 \\ x_3 \\ x_4 \\ x_5 \\ x_6 \\ x_7 \\ x_8 \end{bmatrix} = C_3 x \quad (9)$$

$$C_3 = [0 \; 1 \; 0 \; 0 \; 0 \; 0 \; 0 \; 0]$$

In the above output equation (9), y3 is the up/down direction displacement $x_{er}$ of a series spring-damper connection point of the rear mounts 34A, 34B, which configures the parameters related to the hysteresis characteristics. In the present embodiment, y3 is calculated by the state quantity estimating unit 27 and is outputted to the correction amount computing unit 28.

In FIG. 5, $F_1$ and $F_2$ are forces defined as follows.

$$F_1 = -K_{e1f}[L_{emf}\theta_e - \{x_v + (L_f + L_{emf})\theta_p\}] - K_{e2f}(L_{emf}\theta_e - x_{ef})$$

$$F_2 = K_{e1r}[L_{emr}\theta_e + \{x_e + (L_f - L_{emr})\theta_p\}] + K_{e2r}(L_{emr}\theta_e + x_{er})$$

Next, with reference to FIGS. 6A, 6B to 11A, 11B, frequency characteristics and step response characteristics of a coupled vibration system of the engine 32, etc. and the vehicle body 31 with respect to the above output equations (7) to (9) are described. In these figures, a graph expressed by a solid line shows dynamic characteristics with a control based on the present embodiment, and a graph expressed by a dotted line dynamic characteristics without the control based on the present embodiment.

Figure 6A:
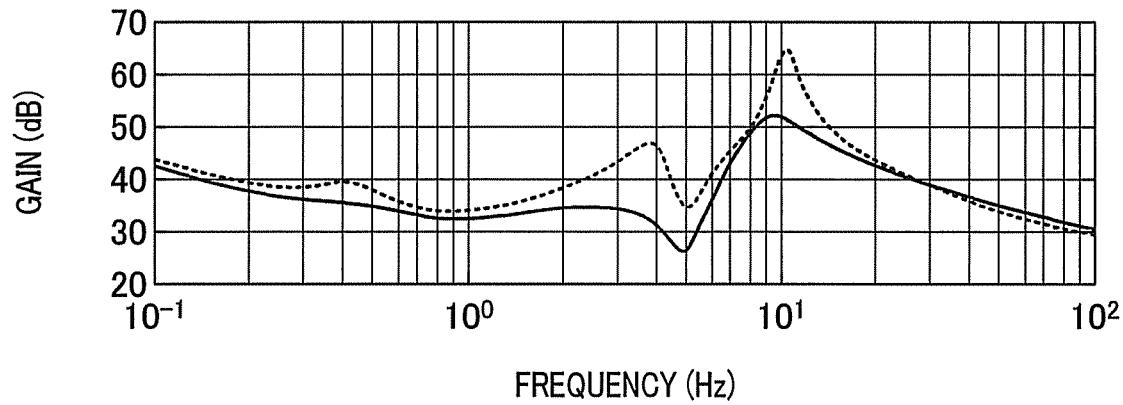
FIGS. 6A and 6B are graphs showing frequency characteristics of a coupled vibration system with respect to an output equation (7) of a translational force.
Figure 6B:
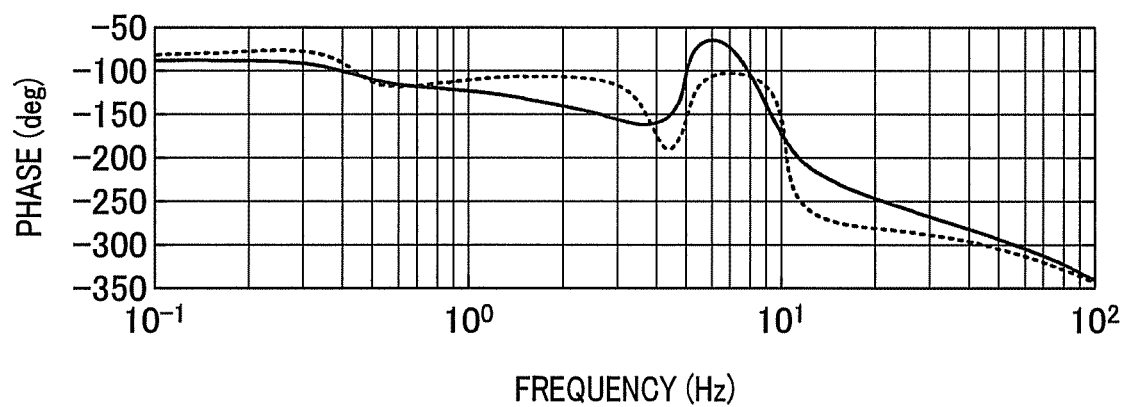

FIGS. 6A and 6B show frequency characteristics of the above coupled vibration system with respect to the output equation (7) of a rate of change ($dF_{ds}/dt$) in the translational force $F_{ds}$. As shown in FIG. 6A, without the control based on the present embodiment, three peaks meaning occurrence of resonance at three different frequencies can be confirmed. In contrast, as shown in FIG. 6B, with the control based on the present embodiment, an effect suppressing resonance can be confirmed in the respective frequencies.

Figure 7A:
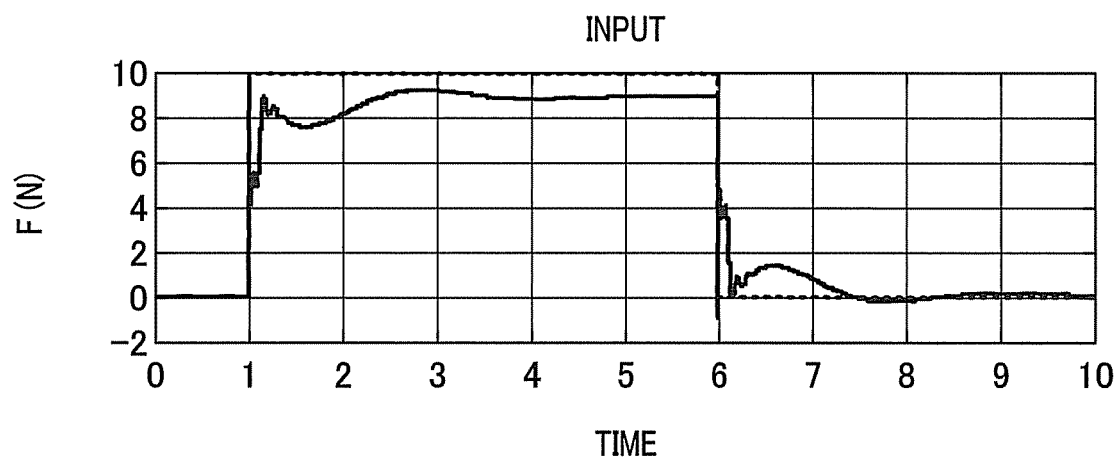
FIGS. 7A and 7B are graphs showing step response characteristics of a coupled vibration system with respect to an output equation (7) of a translational force.
Figure 7B:
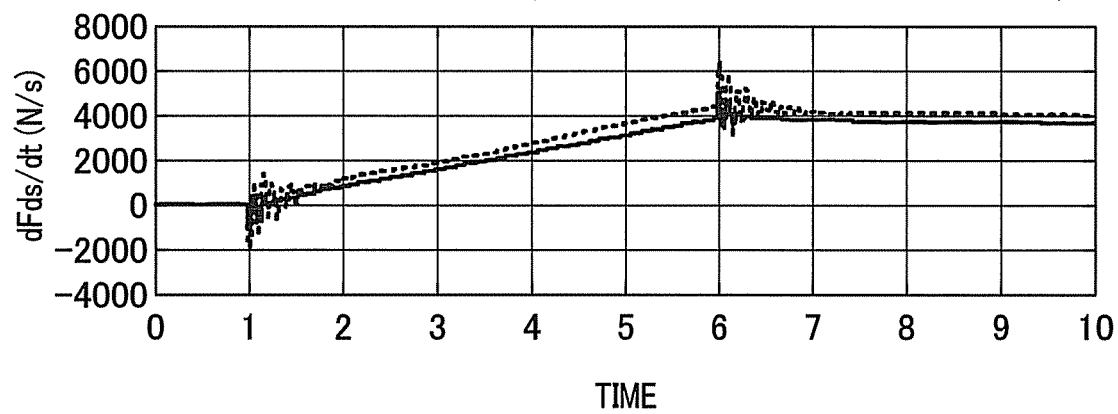

FIGS. 7A and 7B shows step response characteristics of the above coupled vibration system with respect to the output equation (7). As shown in FIG. 7A, in a case with the control based on the present embodiment, compared to a case without the control based on the present embodiment, a step input is confirmed to be corrected. Further, as shown in FIG. 7B, a disturbance of a response to the step input (the rate of change in the translational force $F_{ds}$) is confirmed to be suppressed. Specifically, a disturbance of a response to a rising and falling of the step input is suppressed.

Figure 8A:
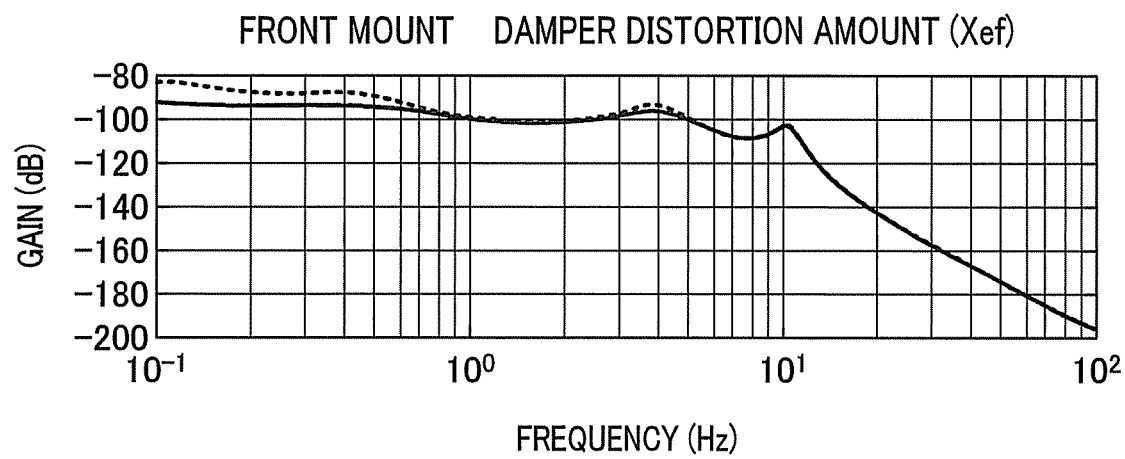
FIGS. 8A and 8B are graphs showing frequency characteristics of a coupled vibration system with respect to an output equation (8) of an up/down direction displacement of a front mount.
Figure 8B:
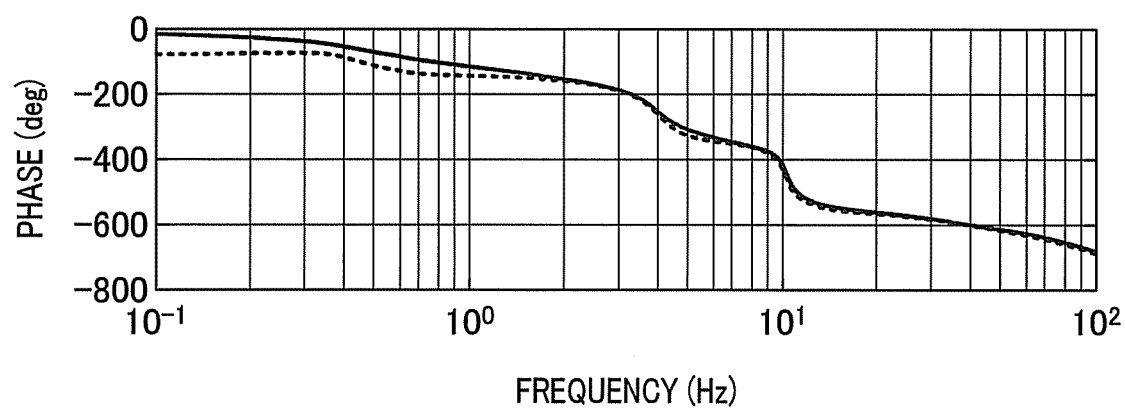
Figure 9A:
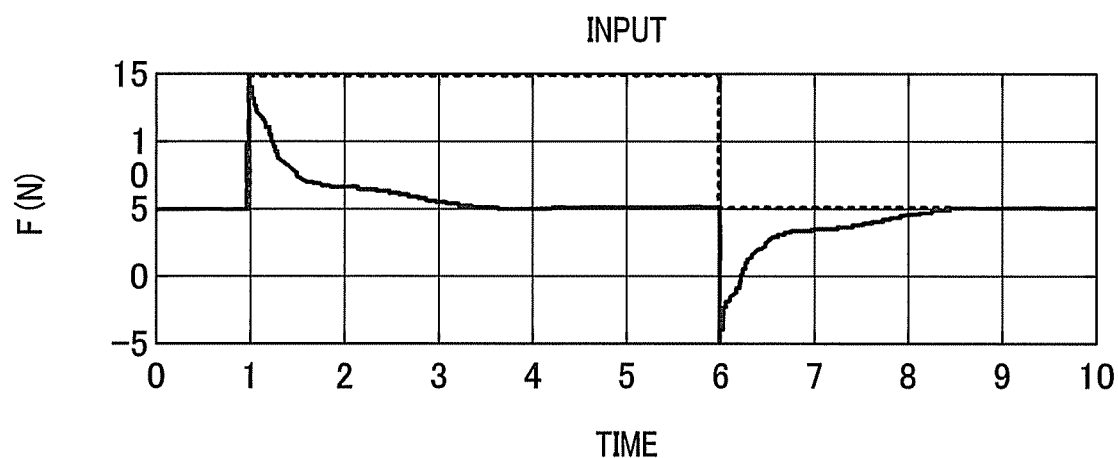
FIGS. 9A and 9B are graphs showing step response characteristics of a coupled vibration system with respect to an output equation (8) of an up/down direction displacement of a front mount.
Figure 9B:
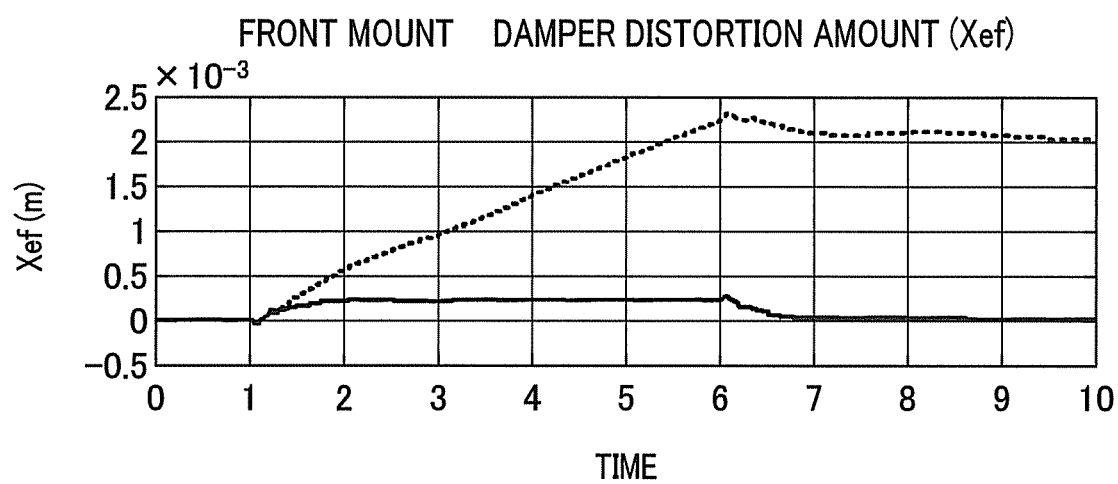

FIGS. 8A and 8B show frequency characteristics of the coupled vibration system with respect to the output equation (8) of an up/down direction displacement $x_{ef}$ of a series spring-damper connection point of the front mounts 33A and 33B. FIGS. 9A and 9B show step response characteristics of the above coupled vibration system with respect to the output equation (8).

Figure 10A:
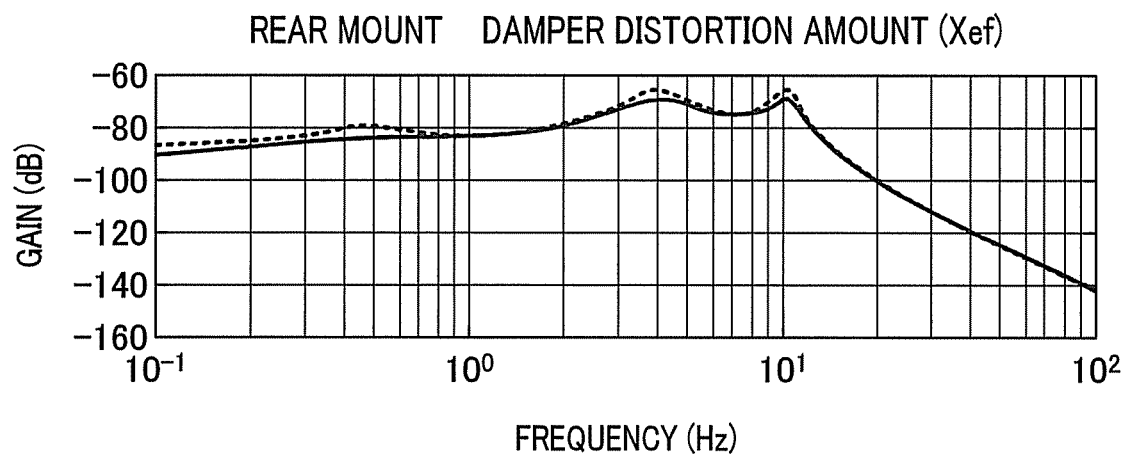
FIGS. 10A and 10B are graphs showing frequency characteristics of a coupled vibration system with respect to an output equation (9) of an up/down direction displacement of a rear mount.
Figure 10B:
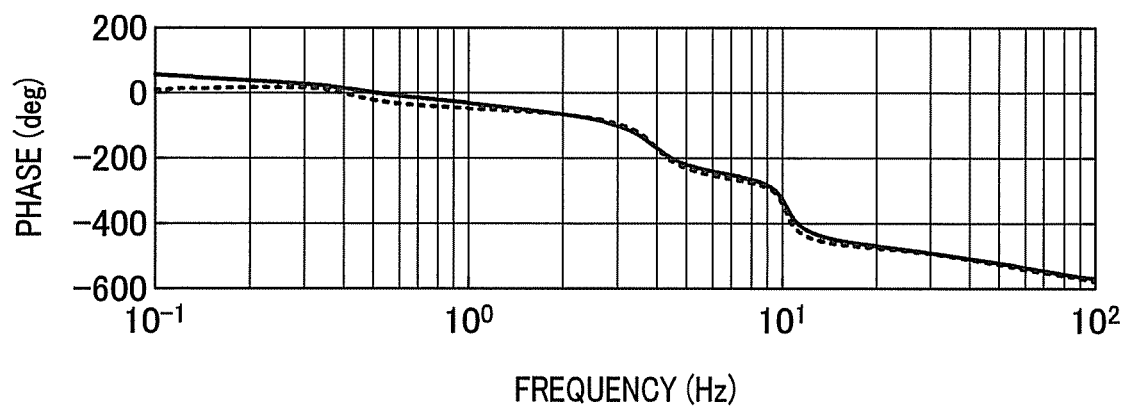
Figure 11A:
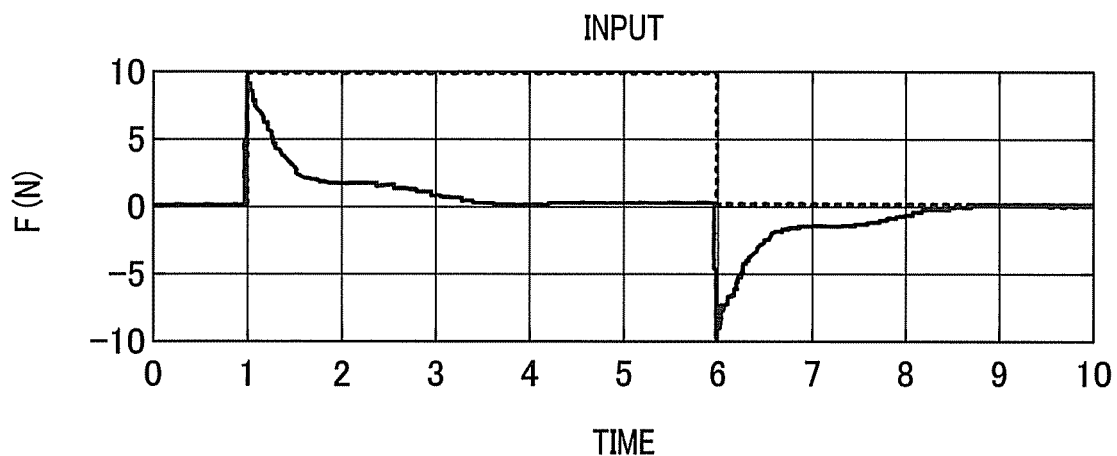
FIGS. 11A and 11B are graphs showing step response characteristics of a coupled vibration system with respect to an output equation (9) of an up/down direction displacement of a rear mount.
Figure 11B:
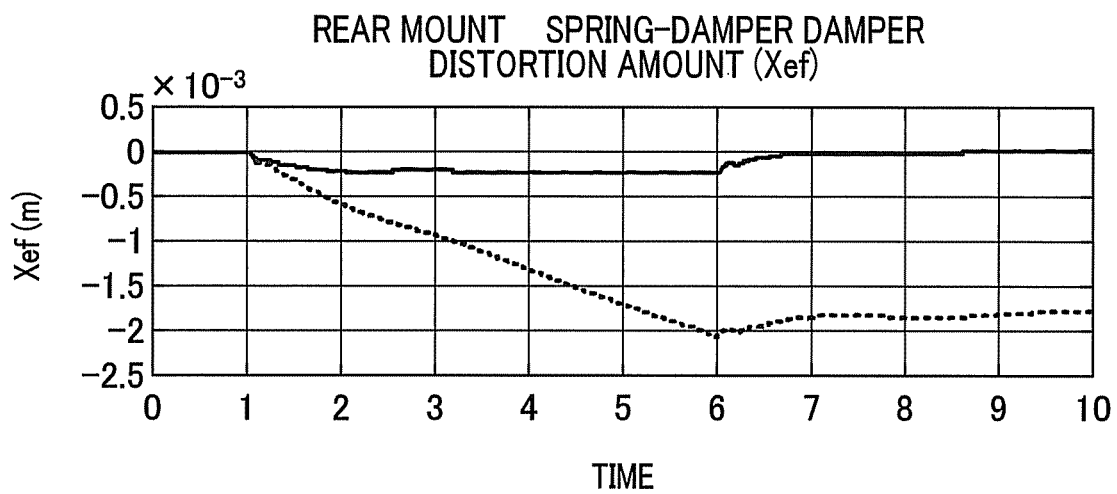

FIGS. 10A and 10B show frequency characteristics of the coupled vibration system with respect to the output equation (9) of an up/down direction displacement of a series spring-damper connection point of the rear mounts 34A and 34B. FIGS. 11A and 11B show step response characteristics of the above coupled vibration system with respect to the output equation (9).

As shown in FIGS. 9A, 9B to 11A, 11B, in a case with the control of the present embodiment, compared to a case without the control of the present embodiment, a step input is confirmed to be substantially corrected. Due to the substantially corrected input, an increase in an amount of damper distortion is suppressed.

Here, the "desired state" of the parameters related to the hysteresis characteristics in the correction amount computing unit 28, in other words, a design of the amount computing unit 28 is described. The correction amount computing unit 28 is designed in such a way that a time response waveform of a target function (time response waveform of an output to an input) becomes desired characteristics based on a linear control theory which is known in related art. The desired state means that, generally, an output to an input in a step response waveform shows time response characteristics as shown in FIGS. 12A to 12C through 14A to 14C. In these figures, a solid line shows a waveform with a control of the present embodiment, and a dotted line shows a waveform without this control.

Figure 12A:
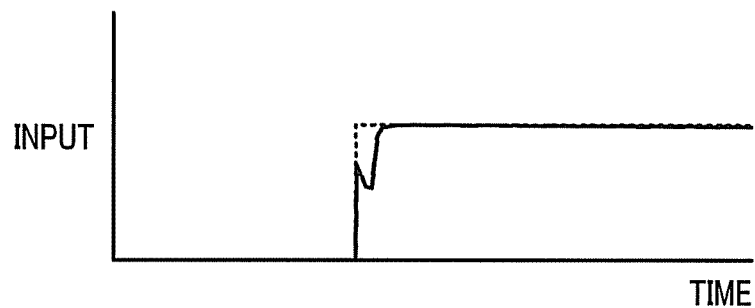
FIGS. 12A, 12B and 12C are graphs explaining time response characteristics in case where vibration is suppressed.
Figure 12B:
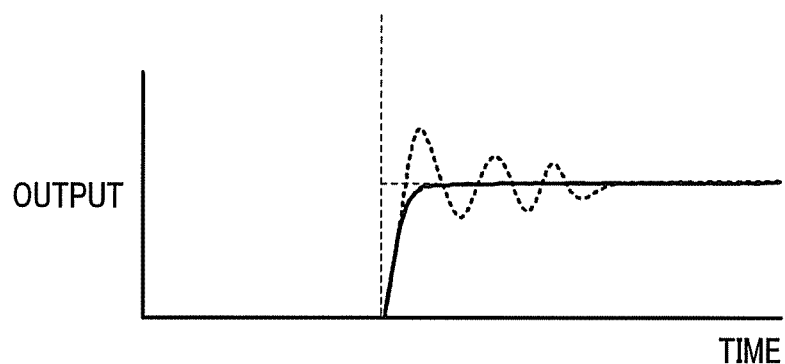
Figure 12C:
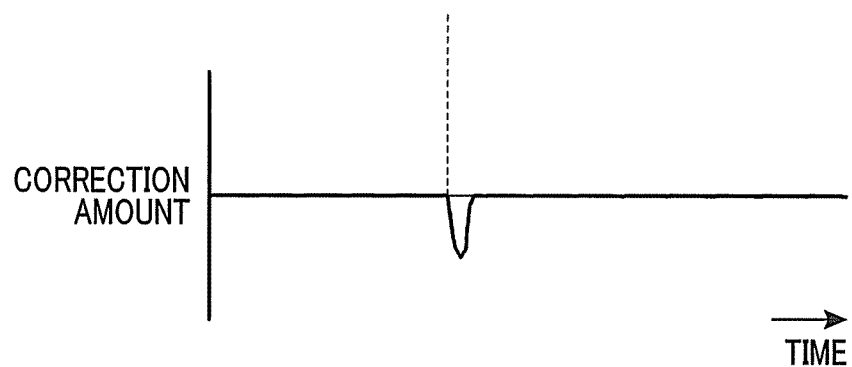

FIGS. 12A, 12B and 12C are graphs explaining time response characteristics in case where vibration is suppressed. FIG. 12A shows a waveform of an input (step input), FIG. 12B shows a waveform of an output to the step input, and FIG. 12C shows a waveform of a correction amount.

When the control of the present embodiment is not performed, as shown in FIG. 12B, an output to a step input may show a waveform that repeats overshoot and undershoot to approach a steady-state value. In contrast, the control of the present embodiment controls a correction amount in such a way that an input value decreases at a rising of a step input as shown in FIG. 12C, so that a waveform of the step input is corrected as shown in FIG. 12A. Thus, as shown FIG. 12B, the output to the step input quickly converges to a steady-state value.

Figure 13A:
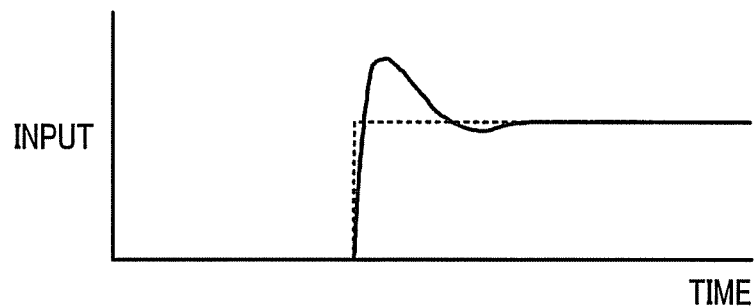
FIGS. 13A, 13B and 13C are graphs explaining time response characteristics in case where responsivity to an input is improved.
Figure 13B:
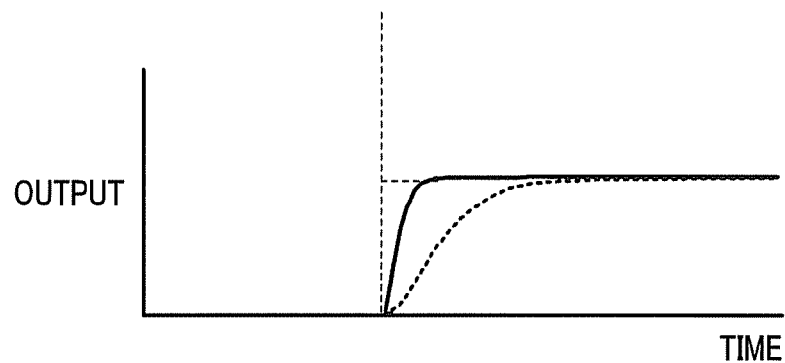
Figure 13C:
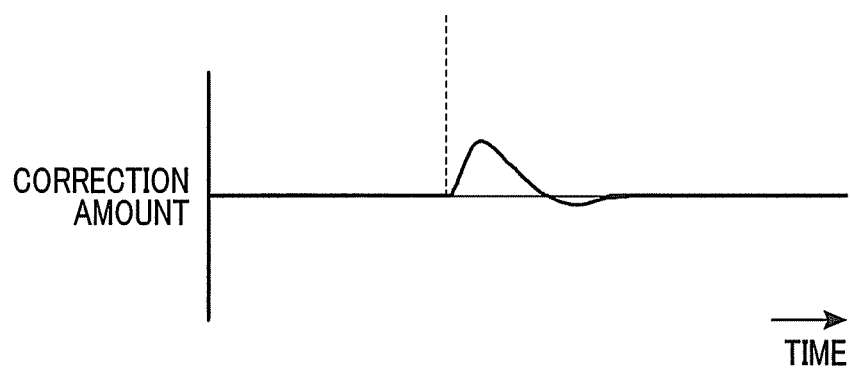

FIGS. 13A, 13B and 13C are graphs explaining time response characteristics in case where responsivity to an input is improved. FIG. 13A shows a waveform of an input (step input), FIG. 13B shows a waveform of an output to the step input, and FIG. 13C shows a waveform of a correction amount.

When the control of the present embodiment is not performed, as shown in FIG. 13B, it may take a long time for an output to a step input to approach a steady-state value. In contrast, the control of the present embodiment controls a correction amount in such a way that an input value increases at a rising of a step input as shown in FIG. 13C, so that a waveform of the step input is corrected as shown in FIG. 13A. Thus, as shown FIG. 13B, the output to the step input rapidly converges to a steady-state value.

Figure 14A:
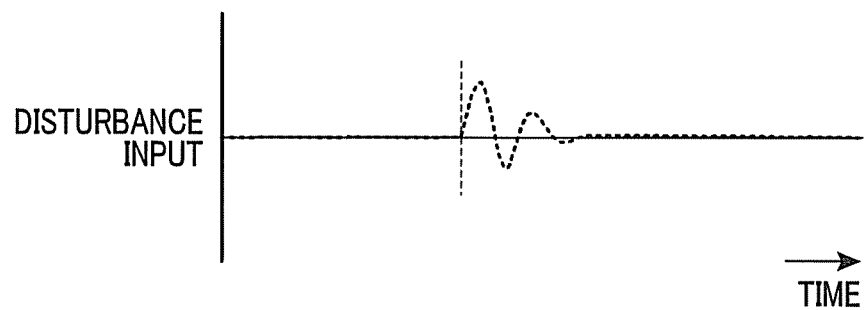
FIGS. 14A, 14B and 14C are graphs explaining time response characteristics in case where a disturbance of an output to a disturbance input is suppressed.
Figure 14B:
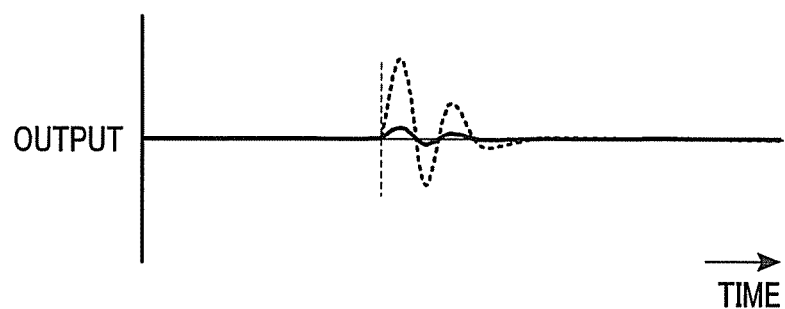
Figure 14C:
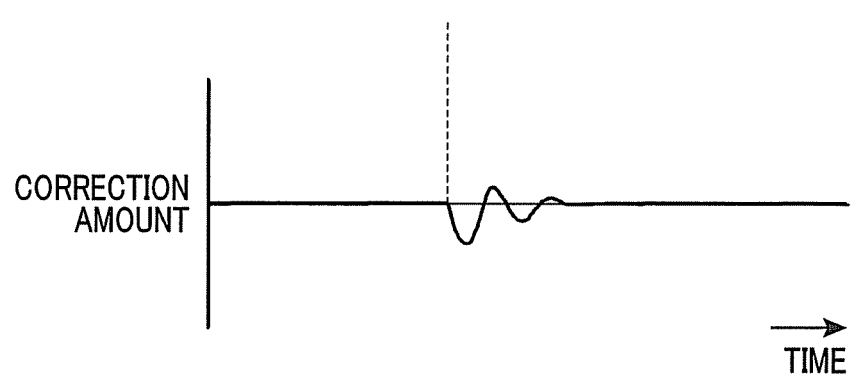

FIGS. 14A, 14B and 14C are graphs explaining time response characteristics in case where a disturbance of an output to a disturbance input is suppressed. FIG. 14A shows a waveform of a disturbance input, FIG. 14B shows a waveform of an output to the disturbance input, and FIG. 14C shows a waveform of a correction amount.

If there is a disturbance input as shown in FIG. 14A without the control of the present embodiment, the output becomes a waveform that is distorted depending on the disturbance input. In contrast, in the control of the present embodiment, a correction amount is controlled so as to have an opposite phase with respect to the disturbance step as shown in FIG. 14C. Thus, a disturbance of the output to the disturbance input is suppressed as shown in FIG. 14B.

According to the above configuration, the vehicle control device 1 simulates hysteresis characteristics caused by the coupled vibration system of the controlled object configured by the engine 32, etc. and the vehicle body 31, and defines parameters which are a control target index (e.g., cy1 to y3 in the output formulae (7) to (9)). Then, this device 1 corrects the basic required drive shaft torque amount by using the drive shaft torque correction amount so that parameters related to the hysteresis characteristics (e.g., y1 to y3 in the output formulae (7) to (9)) become a desired state as explained above (e.g., FIGS. 12A to 12C through FIG. 14A to 14C). Thus, even the vibration of the coupled vibration system of the engine 32, etc. and the vehicle body 31 having non-linear characteristics such as hysteresis characteristics, a design of a control system can be facilitated, and a vibration suppression effect can be produced.

The state amount estimating unit 27 uses the engine/body coupled vibration model including the front mounts 33A, 33B and the rear mounts 34A, 34B which are basic model elements configured by a parallel connection of first and second elements. The first linear element is a series connection of a spring element and a damper element, and the second loner element is a spring element. Thus, hysteresis characteristics caused by the coupled vibration system of the engine 32, etc. and the vehicle body 31 can be simulated.

As above-described in the present embodiment, a spring element may be used as the second element, or a damper element may be used as the second element. The second element is not limited to this type. In the present embodiment, a controlled object is a coupled vibration system of the engine 32, etc. and the vehicle body 31. Thus, coupled vibration of a coupled vibration system having hysteresis characteristics can be simulated. Here, the coupled vibration is caused by spring-damping characteristics due to a viscoelasticity of the front mounts 33A, 33B and the rear mounts 34A, 34B or a viscoelasticity of the vehicle body 31 or the engine 32 itself.

In the present embodiment, a controlled object is a coupled vibration system of the engine 32, etc. and the vehicle body 31, and then, coupled vibration of a coupled vibration system can be controlled. Here, the coupled vibration is caused by a fluctuation of the drive torque of the engine 32, etc., or a fluctuation of a disturbance load received from a road surface via the front wheels 51FR, 51FL and the rear wheels 51RR, 51RL. Specifically, dynamic characteristics of coupled vibration of the engine 32, etc. and the vehicle body 31 can be simulated as dynamic characteristics having hysteresis characteristics. Here, the coupled vibration is caused by a viscoelasticity of the front mounts 33A, 33B and the rear mounts 34A, 34B which are a vibration suppression device.

In the present embodiment, parameters are expressed by a formula of a linear combination of at least one of a stroke displacement (up/down displacement) of the front mounts 33A, 33B, a stroke velocity (up/down velocity) of the front mounts 33A, 33B, a stroke displacement (up/down displacement) of the rear mounts 34A, 34B, a stroke velocity (up/down velocity) of the rear mounts 34A, 34B, a roll angle displacement of the engine 32, etc., a roll angular velocity of the engine 32, etc., an up/down direction displacement of the vehicle body 31, an up/down direction velocity of the vehicle body 31, and a pitch angular velocity of the vehicle body 31. Further, the drive shaft torque correction amount is calculated in such a way that the parameters become a minimum value. Thus, coupled vibration of a coupled vibration system can be suppressed.

Specifically, by using the above drive shaft torque correction amount, a basic required drive shaft torque is corrected, and subsequently, the corrected required drive shaft torque is outputted to the engine 32, etc. Thus, the drive torque produced in the engine 32, etc. is controlled so that coupled vibration of a coupled vibration system can be suppressed.

In the present embodiment, the output equation (7) of a rate of change ($dF_{ds}/dt$) of the translational force $F_{ds}$, the output equation (8) of an up/down direction displacement $x_{ef}$ of a series spring-damper connection point of the front mounts 33A, 33B, the output equation (9) of an up/down direction displacement of a series spring-damper connection point of the rear mounts 34A, 34B are applied.

In addition, the following output equations, i.e., an output equation (10) of a roll angular velocity ($d\theta_e/dt$) of the engine 32, etc. or an output equation (11) of a pitch angular velocity ($d\theta_p/dt$) of the vehicle body 31 may be applied.

$$y_4 = \dot{\theta}_e = x_4 = [0\ 0\ 0\ 1\ 0\ 0\ 0\ 0]\begin{bmatrix}x_1\\x_2\\x_3\\x_4\\x_5\\x_6\\x_7\\x_8\end{bmatrix} = C_4 x \quad (10)$$

$$C_4 = [0\ 0\ 0\ 1\ 0\ 0\ 0\ 0]$$

$$x = [x_1\ x_2\ x_3\ x_4\ x_5\ x_6\ x_7\ x_8]^T$$

In the above output equation (10), y4 is the roll angular velocity ($d\theta_e/dt$) of the engine 32, etc., which configures the parameters related to the hysteresis characteristics. In the present embodiment, y4 is calculated by the state quantity estimating unit 27 and is outputted to the correction amount computing unit 28.

$$y_5 = \dot{\theta}_p = x_8 = [0\ 0\ 0\ 0\ 0\ 0\ 0\ 1]\begin{bmatrix}x_1\\x_2\\x_3\\x_4\\x_5\\x_6\\x_7\\x_8\end{bmatrix} = C_5 x \quad (11)$$

$$C_5 = [0\ 0\ 0\ 0\ 0\ 0\ 0\ 1]$$

In the above output equation (11), y5 is the pitch angular velocity ($d\theta_p/dt$) of the vehicle body 31, which configures the parameters related to the hysteresis characteristics. In the present embodiment, y5 is calculated by the state quantity estimating unit 27 and is outputted to the correction amount computing unit 28.

Next, with reference to FIGS. 15A, 15B to 18A, 18B, frequency characteristics and step response characteristics of a coupled vibration system of the engine 32, etc. and the vehicle body 31 with respect to the output equations (10) and (11) as explained above are described.

Figure 15A:
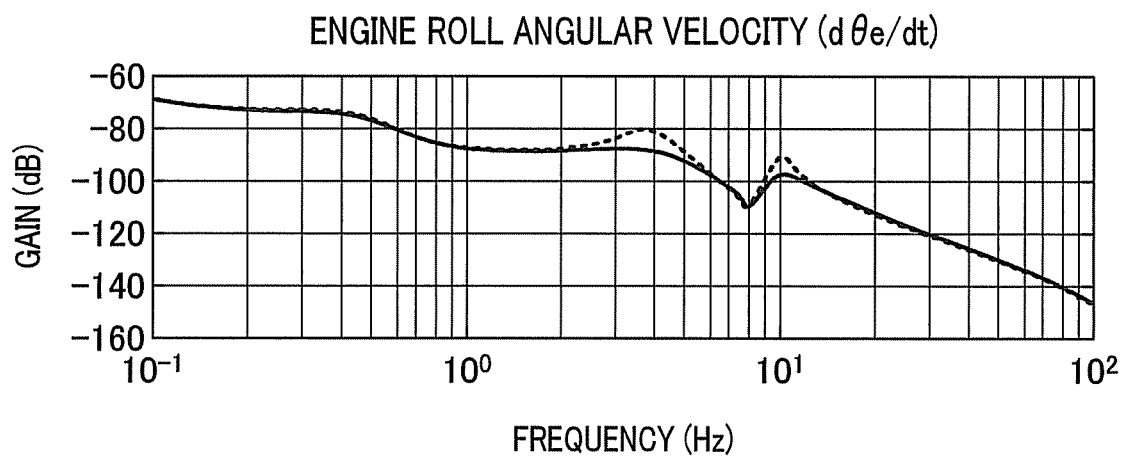
FIGS. 15A and 15B are graphs showing frequency characteristics of a coupled vibration system with respect to an output equation (10) of a roll angular velocity of an engine.
Figure 15B:
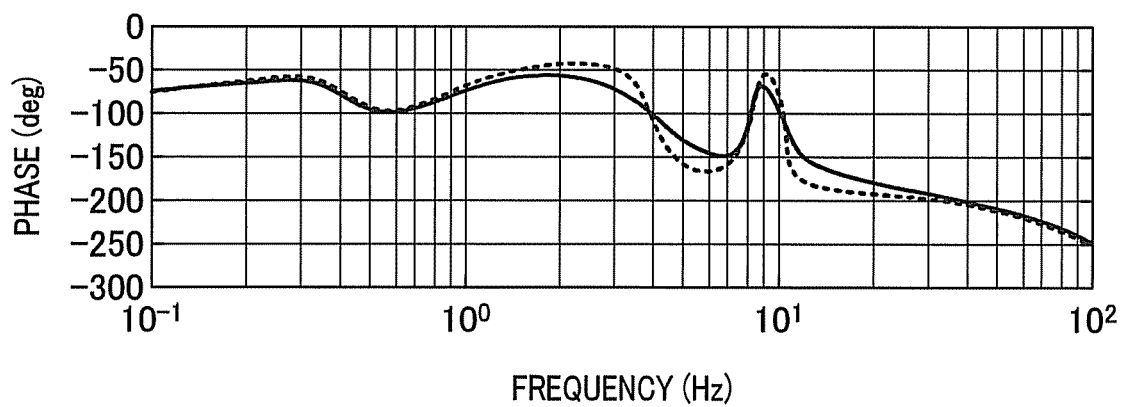

FIGS. 15A and 15B show frequency characteristics of the above coupled vibration system with respect to the output equation (10) of a roll angular velocity ($d\theta_e/dt$) of the engine 32, etc. As shown in FIG. 15A, without the control of the present embodiment, two peaks meaning occurrence of resonance in two different frequencies can be confirmed. In contrast, with the control of the present embodiment, the two peaks are confirmed to become gentle.

Figure 16A:
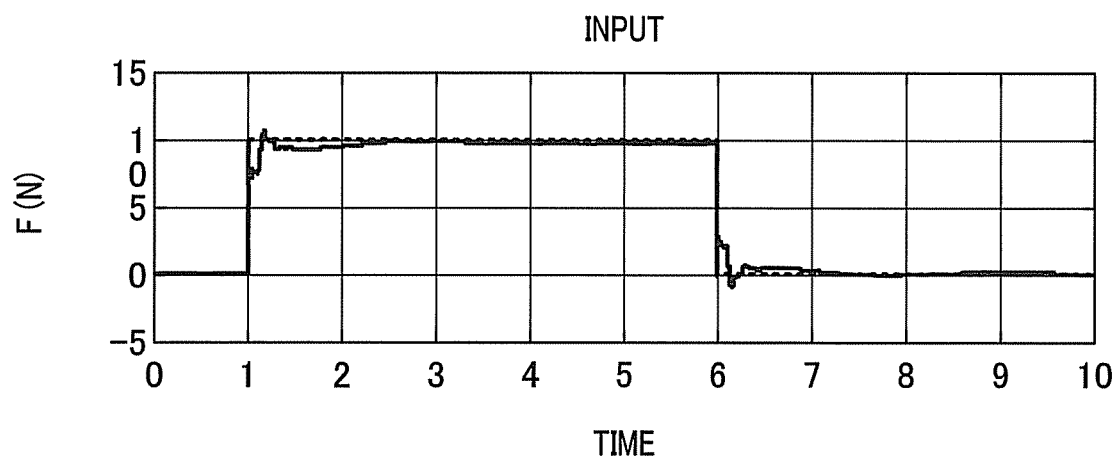
FIGS. 16A and 16B are graphs showing step response characteristics of a coupled vibration system with respect to an output equation (10) of a roll angular velocity of an engine.
Figure 16B:
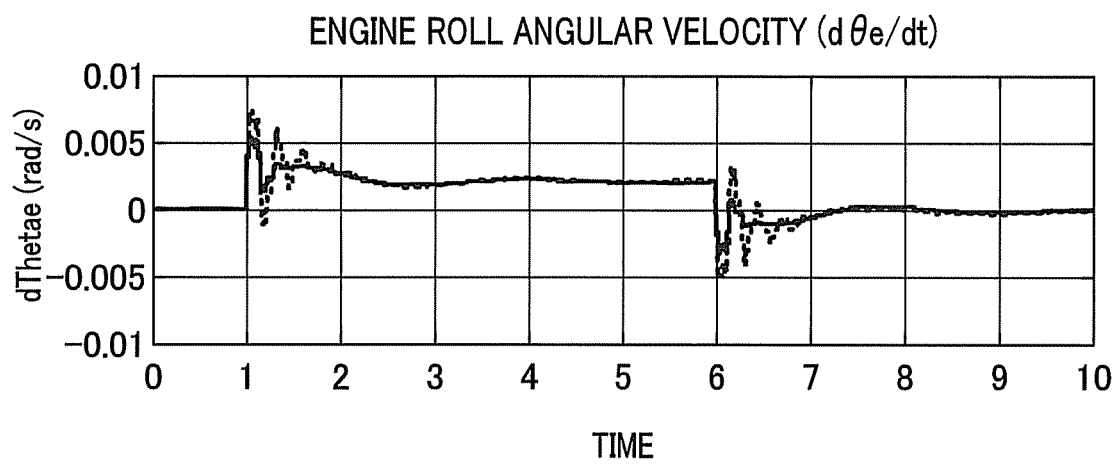

FIGS. 16A and 16B show step response characteristics of the above coupled vibration system with respect to the output equation (10). As shown in FIG. 16A, in a case with the control of the present embodiment, compared to a case without the control of the present embodiment, a step input is confirmed to be corrected. Further, as shown in FIG. 16B, a disturbance of a response to the step input (roll angular velocity $d\theta_e/dt$) is confirmed to be suppressed. Specifically, a disturbance of a response to a rising and falling of the step input is suppressed.

Figure 17A:
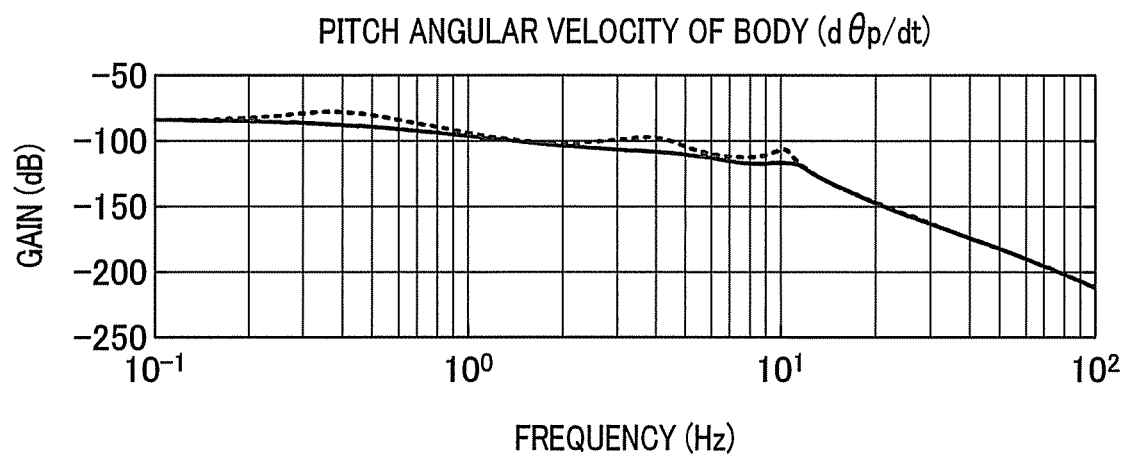
FIGS. 17A and 17B are graphs showing frequency characteristics of a coupled vibration system with respect to an output equation (11) of a pitch angular velocity of a vehicle body.
Figure 17B:
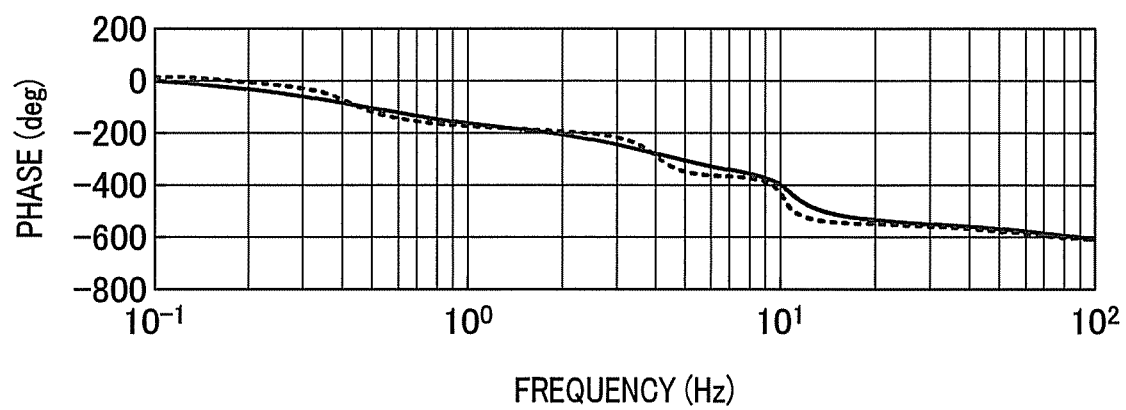
Figure 18A:
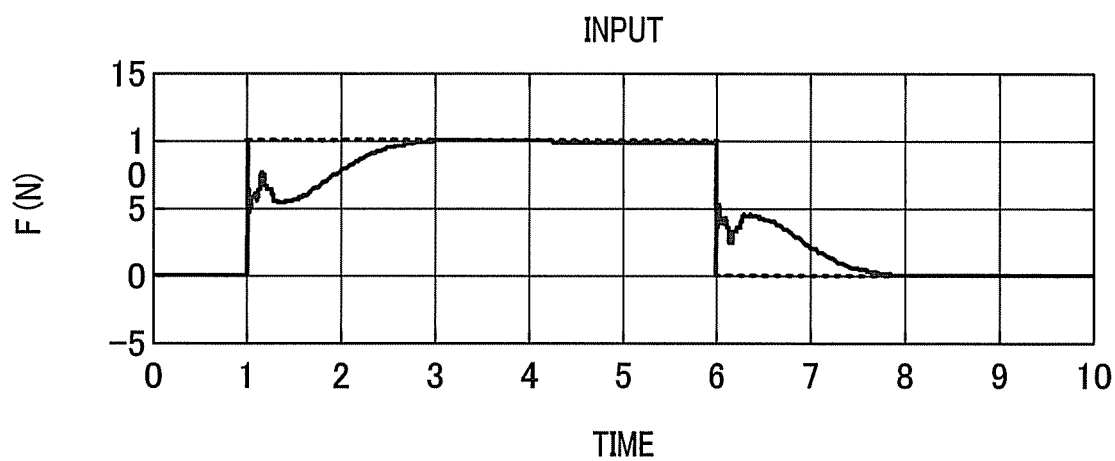
FIGS. 18A and 18B are graphs showing step response characteristics of a coupled vibration system with respect to an output equation (11) of a pitch angular velocity of a vehicle body.
Figure 18B:
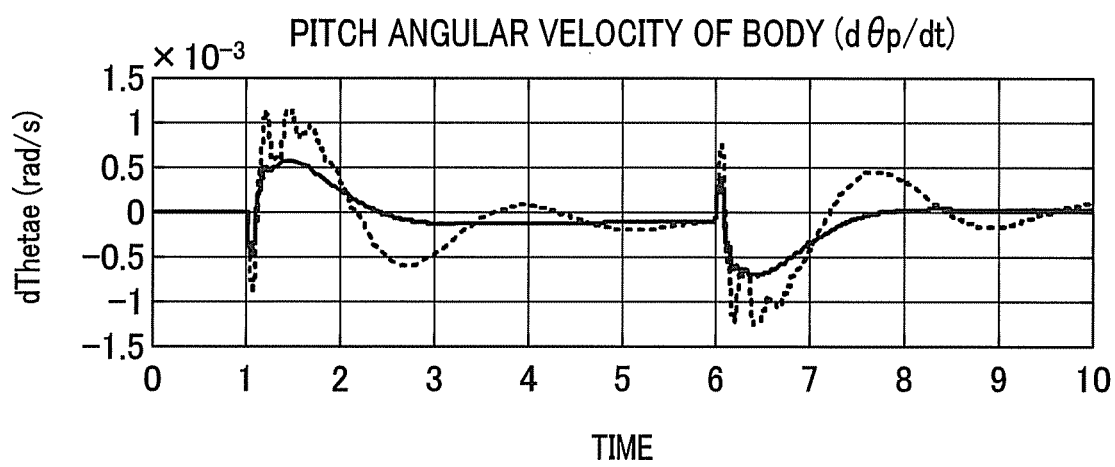

FIGS. 17A and 17B show frequency characteristics of the above coupled vibration system with respect to the output equation (11) of a pitch angular velocity ($d\theta_p/dt$) of the vehicle body 31. FIGS. 18A and 18B show step response characteristics of the above coupled vibration system with respect to the output equation (11).

As shown in FIG. 17A, without the control of the present embodiment, three peaks meaning occurrence of resonance in three different frequencies can be confirmed. In contrast, with the control of the present embodiment, an effect suppressing resonance can be confirmed in the respective frequencies.

As shown in FIG. 18A, in a case with the control of the present embodiment, compared to a case without the control of the present embodiment, a step input is confirmed to be corrected. Further, as shown in FIG. 18B, a disturbance of a response to the step input (pitch angular velocity $d\theta_p/dt$) is confirmed to be suppressed. Specifically, disturbance of a response to a rising and falling of the step input is suppressed.

According to the embodiments as explained above, the vehicle control device simulates, by the model element (engine/body coupled vibration model), hysteresis characteristics caused by the coupled vibration system of the controlled object, and defines a control target index (parameters) related to hysteresis characteristics. Then, this device corrects the manipulated variable (basic required drive shaft torque amount) by using the correction amount (drive shaft torque correction amount) so that the control target index related to the hysteresis characteristics become a desired state. Thus, even the vibration having non-linear characteristics such as hysteresis characteristics, a design of a control system can be facilitated, and a vibration suppression effect can be produced.

(Modifications)

The present invention may be embodied in several other forms without departing from the spirit thereof. The embodiments described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims. For example, the embodiments described above may be modified as follows.

A controlled object to which the present embodiment is applied can be applied irrespective of a driving system of a vehicle. Even if an engine is longitudinally mounted in a front engine rear drive (FR) vehicle, the controlled object can be applied to coupled vibration of a roll vibration of an engine transmission and a roll vibration of a vehicle body.

Further, the controlled object may be applied to coupled vibration other than the above coupled vibration.

For example, (i) a spring-damper system between a tire and a vehicle body disclosed in Japanese Patent No. 4356305 can be used as a substitute for the basic model elements configured by connecting the first linear element and the second linear element in series as described in the present embodiment. Here, the first linear element is a series connection of a spring element and a damper element as described in the present embodiment, and the second linear element is a spring element.

In addition, (ii) a spring-damper system between a tire and a vehicle body or (iii) a spring-damper system between a vehicle body and an engine disclosed in Japanese Patent No. 4161923 and JP-A-2006-060936 can be used as a substitute for the above basic model elements configured by connecting the first linear element and the second linear element in series as described in the present embodiment. Here, the first linear element is a series connection of a spring element and a damper element as described in the present embodiment, and the second linear element is a spring element.

Further, (iv) a spring-damper system between a road surface and a tire, (v) a spring-damper system between a driven wheel shaft and a driving wheel shaft, (vi) a spring-damper system between a front wheel shaft and a chassis frame, or (vii) a spring-damper system between a rear wheel shaft and a chassis frame disclosed in Japanese Patent No. 4277915 and Japanese Patent No. 4333767 can be used as a substitute for the basic model elements configured by connecting the first linear element and the second linear element in series as described in the present embodiment. Here, the first linear element is a series connection of a spring element and a damper element as described in the present embodiment, and the second linear element is a spring element.

What is claimed is:

1. A vehicle control device for controlling a motion state of a controlled object which moves or deforms, in accordance with a manipulated variable inputted from outside, the vehicle device comprising:
    an engine electronic control unit that is mounted to a vehicle and controls an engine of the vehicle; and
    a correction computing unit that is mounted to the vehicle and comprises:
        a dynamic characteristics description unit that includes a model element for simulating dynamic characteristics of motion or deformation of the controlled object, simulates, by using the model element, hysteresis characteristics caused during a process of motion or deformation of the controlled object based on at least one of an estimated value of the manipulated variable and an estimated value of a disturbance input inputted in the controlled object, and defines a control target index of a motion state of the controlled object related to the hysteresis characteristics;
        a correction amount computing unit that calculates a correction amount which adjusts the manipulated variable in such a way that the control target index related to the hysteresis characteristics defined by the dynamic characteristics description unit becomes a desired state; and
        a command output unit that corrects the manipulated variable based on the correction amount calculated by the correction amount computing unit to produce a command for the corrected manipulated variable, and that outputs the command to the controlled object, wherein the model element includes at least one of basic model elements configured by a parallel connection of:
    a first linear element that connects a first spring element and a first damper element in series; and
    a second linear element that is any one of a second spring element, a second damper element, or a parallel connection of the second spring element and the second damper element.

2. The vehicle control device according to claim 1, wherein:
    the controlled object includes a first element that configures a vehicle, and a second element that is an element configuring the vehicle other than the first element or that is a road surface; and
    the first element and the second element causes coupled vibration due to spring-damping characteristics of a connection element that connects the first element and the second element or due to spring-damping characteristics of at least one of the first element and the second element.

3. The vehicle control device according to claim 2, wherein:
    the first element is a vehicle body of the vehicle;
    the second element is an engine of the vehicle;
    the vehicle body and the engine are connected by the connection element configuring a vibration suppression device;
    the manipulated variable is a required drive shaft torque that is inputted in the engine; and
    the disturbance input is a disturbance load that is inputted from a road surface.

4. The vehicle control device according to claim 3, wherein:
    the vibration suppression device is provided with a front mount located at a front side of the vehicle and a rear mount located at a rear side of the vehicle;
    the control target index is expressed by a formula of a linear combination of at least one of a stroke displacement of the front mount, a stroke velocity of the front mount, a stroke displacement of the rear mount, a stroke velocity of the rear mount, a roll angle displacement of the engine, a roll angular velocity of the engine, an up/down direction displacement of the vehicle body, an up/down direction velocity of the vehicle body, a pitch angle displacement of the vehicle body, and a pitch angular velocity of the vehicle body; and
    the correction amount computing unit calculates the correction amount in such a way that the control target index becomes a minimum value.

5. A vehicle control method for controlling a motion state of a controlled object which moves or deforms, in accordance with a manipulated variable inputted from outside, the method comprising:
    simulating, at a correction computing unit mounted to a vehicle, by using a model element for simulating dynamic characteristics of motion or deformation of the controlled object, hysteresis characteristics caused during a process of motion or deformation of the controlled object based on at least one of an estimated value of the manipulated variable and an estimated value of a disturbance input inputted in the controlled object, and defining a control target index of a motion state of the controlled object related to the hysteresis characteristics;
    calculating, by the correction computing unit, a correction amount which adjusts the manipulated variable in such a way that the control target index related to the hysteresis characteristics becomes a desired state; and correcting, by the correction computing unit, the manipulated variable based on the correction amount calculated by the correction amount computing unit to produce a command for the corrected manipulated variable, and outputting the command from the correction computing unit to the controlled object, wherein the model element includes at least one of basic model elements configured by a parallel connection of:

a first linear element that connects a first spring element and a first damper element in series; and a second linear element that is any one of a second spring element, a second damper element, or a parallel connection of the second spring element and the second damper element.

6. The vehicle control method according to claim 5, wherein:

the controlled object includes a first element that configures a vehicle, and a second element that is an element configuring the vehicle other than the first element or that is a road surface; and the first element and the second element causes coupled vibration due to spring-damping characteristics of a connection element that connects the first element and the second element or due to spring-damping characteristics of at least one of the first element and the second element.

7. The vehicle control method according to claim 6, wherein:

the first element is a vehicle body of the vehicle;

the second element is an engine of the vehicle;

the vehicle body and the engine are connected by the connection element configuring a vibration suppression device;

the manipulated variable is a required drive shaft torque that is inputted in the engine; and the disturbance input is a disturbance load that is inputted from a road surface.

8. The vehicle control method according to claim 7, wherein:

the vibration suppression device is provided with a front mount located at a front side of the vehicle and a rear mount located at a rear side of the vehicle;

the control target index is expressed by a formula of a linear combination of at least one of a stroke displacement of the front mount, a stroke velocity of the front mount, a stroke displacement of the rear mount, a stroke velocity of the rear mount, a roll angle displacement of the engine, a roll angular velocity of the engine, an up/down direction displacement of the vehicle body, an up/down direction velocity of the vehicle body, a pitch angle displacement of the vehicle body, and a pitch angular velocity of the vehicle body; and the correction amount is calculated in such a way that the control target index becomes a minimum value.

\* \* \* \* \*